(12) United States Patent
Kumar et al.

(10) Patent No.: US 9,054,977 B2
(45) Date of Patent: Jun. 9, 2015

(54) AUTOMATIC NOC TOPOLOGY GENERATION

(71) Applicant: NETSPEED SYSTEMS, San Jose, CA (US)

(72) Inventors: Sailesh Kumar, San Jose, CA (US);
Amit Patankar, San Jose, CA (US);
Eric Norige, East Lansing, MI (US)

(73) Assignee: NetSpeed Systems, San Jose, CA (US)

( * ) Notice: Subject to any disclaimer, the term of this patent is extended or adjusted under 35 U.S.C. 154(b) by 191 days.

(21) Appl. No.: 13/959,541

(22) Filed: Aug. 5, 2013

(65) Prior Publication Data

US 2015/0036536 A1    Feb. 5, 2015

(51) Int. Cl.
*H04L 12/24*    (2006.01)
*H04L 12/931*    (2013.01)

(52) U.S. Cl.
CPC ............ *H04L 41/12* (2013.01); *H04L 41/0826* (2013.01); *H04L 49/00* (2013.01)

(58) Field of Classification Search
CPC ..... H04L 41/12; H04L 41/0826; H04L 12/24; H04L 12/761; H04L 45/04; H04L 49/00; G06F 17/50; G06F 17/5031; G06F 17/5004; G06F 17/5018; G06F 17/5068; G06F 17/5045; G06F 17/5077; G06F 217/64
USPC .................................................. 370/254–469
See application file for complete search history.

(56) References Cited

U.S. PATENT DOCUMENTS

| | | | |
|---|---|---|---|
| 4,933,933 A | 6/1990 | Dally et al. | |
| 5,355,455 A | 10/1994 | Hilgendorf et al. | |
| 5,432,785 A | 7/1995 | Ahmed et al. | |
| 5,764,740 A | 6/1998 | Holender | |
| 5,991,308 A | 11/1999 | Fuhrmann et al. | |
| 6,003,029 A | 12/1999 | Agrawal et al. | |
| 6,101,181 A | 8/2000 | Passint et al. | |
| 6,108,739 A | 8/2000 | James et al. | |
| 6,249,902 B1 | 6/2001 | Igusa et al. | |
| 6,314,487 B1 | 11/2001 | Hahn et al. | |

(Continued)

FOREIGN PATENT DOCUMENTS

| | | |
|---|---|---|
| CN | 103684961 A | 3/2014 |
| WO | 2014059024 A1 | 4/2014 |

OTHER PUBLICATIONS

International Search Report and Written Opinion for PCT/US2014/023625, Jul. 10, 2014, 9 pgs.

(Continued)

*Primary Examiner* — Afsar M Qureshi
(74) *Attorney, Agent, or Firm* — Procopio, Cory, Hargreaves & Savitch LLP

(57) ABSTRACT

Example implementations described herein are directed to automatically determine an optimal NoC topology using heuristic based optimizations. First, an optimal orientation of ports of various hosts is determined based on the system traffic and connectivity specification. Second, the NoC routers to which the host's port are directly connected to are determined in the NoC layout. Third, an optimal set of routes are computed for the system traffic and the required routers and channels along the routes are allocated forming the full NoC topology. The three techniques can be applied in any combination to determine NoC topology, host port orientation, and router connectivity that reduces load on various NoC channels and improves latency, performance, and message transmission efficiency between the hosts.

17 Claims, 26 Drawing Sheets

(56) References Cited

U.S. PATENT DOCUMENTS

| | | |
|---|---|---|
| 6,415,282 B1 | 7/2002 | Mukherjea et al. |
| 6,456,961 B1 * | 9/2002 | Patil et al. ............... 703/14 |
| 6,925,627 B1 | 8/2005 | Longway et al. |
| 7,065,730 B2 | 6/2006 | Alpert et al. |
| 7,318,214 B1 | 1/2008 | Prasad et al. |
| 7,590,959 B2 | 9/2009 | Tanaka |
| 7,724,735 B2 | 5/2010 | Locatelli et al. |
| 7,725,859 B1 | 5/2010 | Lenahan et al. |
| 7,808,968 B1 | 10/2010 | Kalmanek, Jr. et al. |
| 7,917,885 B2 | 3/2011 | Becker |
| 7,957,381 B2 | 6/2011 | Clermidy et al. |
| 8,050,256 B1 | 11/2011 | Bao et al. |
| 8,059,551 B2 | 11/2011 | Milliken |
| 8,099,757 B2 | 1/2012 | Riedle et al. |
| 8,136,071 B2 | 3/2012 | Solomon |
| 8,203,938 B2 | 6/2012 | Gibbings |
| 8,281,297 B2 | 10/2012 | Dasu et al. |
| 8,312,402 B1 | 11/2012 | Okhmatovski et al. |
| 8,412,795 B2 | 4/2013 | Mangano et al. |
| 8,448,102 B2 | 5/2013 | Kornachuk et al. |
| 8,490,110 B2 | 7/2013 | Hoover et al. |
| 8,492,886 B2 | 7/2013 | Or-Bach et al. |
| 8,541,819 B1 | 9/2013 | Or-Bach et al. |
| 8,543,964 B2 | 9/2013 | Ge et al. |
| 8,601,423 B1 | 12/2013 | Philip et al. |
| 8,635,577 B2 | 1/2014 | Kazda et al. |
| 8,667,439 B1 | 3/2014 | Kumar et al. |
| 8,705,368 B1 | 4/2014 | Abts et al. |
| 8,717,875 B2 | 5/2014 | Bejerano et al. |
| 8,738,860 B1 | 5/2014 | Griffin et al. |
| 8,819,611 B2 * | 8/2014 | Philip et al. ............... 716/131 |
| 2002/0071392 A1 | 6/2002 | Grover et al. |
| 2002/0073380 A1 | 6/2002 | Cooke et al. |
| 2002/0083159 A1 | 6/2002 | Ward et al. |
| 2002/0095430 A1 | 7/2002 | Egilsson et al. |
| 2002/0191241 A1 * | 12/2002 | Emery et al. ............... 359/109 |
| 2004/0216072 A1 | 10/2004 | Alpert et al. |
| 2005/0147081 A1 | 7/2005 | Acharya et al. |
| 2005/0203988 A1 | 9/2005 | Nollet et al. |
| 2005/0251646 A1 * | 11/2005 | Klecka et al. ............... 712/10 |
| 2006/0161875 A1 | 7/2006 | Rhee |
| 2006/0209846 A1 | 9/2006 | Clermidy et al. |
| 2006/0268909 A1 | 11/2006 | Langevin et al. |
| 2007/0088537 A1 | 4/2007 | Lertora et al. |
| 2007/0118320 A1 | 5/2007 | Luo et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2008/0072182 A1 | 3/2008 | He et al. |
| 2008/0120129 A1 | 5/2008 | Seubert et al. |
| 2008/0232387 A1 | 7/2008 | Rijpkema et al. |
| 2008/0313480 A1 * | 12/2008 | Malhi et al. ............... 713/323 |
| 2009/0046727 A1 | 2/2009 | Towles |
| 2009/0070726 A1 | 3/2009 | Mehrotra et al. |
| 2009/0268677 A1 | 10/2009 | Chou et al. |
| 2009/0313592 A1 | 12/2009 | Murali et al. |
| 2010/0040162 A1 | 2/2010 | Suehiro |
| 2011/0022754 A1 | 1/2011 | Cidon et al. |
| 2011/0035523 A1 | 2/2011 | Feero et al. |
| 2011/0060831 A1 | 3/2011 | Ishii et al. |
| 2011/0072407 A1 | 3/2011 | Keinert et al. |
| 2011/0103799 A1 | 5/2011 | Shacham et al. |
| 2011/0154282 A1 | 6/2011 | Chang et al. |
| 2011/0276937 A1 | 11/2011 | Waller |
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0099475 A1 | 4/2012 | Tokuoka |
| 2012/0110541 A1 | 5/2012 | Ge et al. |
| 2012/0155250 A1 | 6/2012 | Carney et al. |
| 2013/0028090 A1 | 1/2013 | Yamaguchi et al. |
| 2013/0051397 A1 | 2/2013 | Guo et al. |
| 2013/0080073 A1 | 3/2013 | de Corral |
| 2013/0103369 A1 | 4/2013 | Huynh et al. |
| 2013/0151215 A1 | 6/2013 | Mustapha |
| 2013/0159944 A1 | 6/2013 | Uno et al. |
| 2013/0174113 A1 | 7/2013 | Lecler et al. |
| 2013/0207801 A1 | 8/2013 | Barnes |
| 2013/0219148 A1 | 8/2013 | Chen et al. |
| 2013/0263068 A1 | 10/2013 | Cho et al. |
| 2013/0326458 A1 | 12/2013 | Kazda et al. |
| 2014/0068132 A1 | 3/2014 | Philip et al. |
| 2014/0092740 A1 | 4/2014 | Wang et al. |
| 2014/0098683 A1 | 4/2014 | Kumar et al. |
| 2014/0115218 A1 | 4/2014 | Philip et al. |
| 2014/0115298 A1 | 4/2014 | Philip et al. |

OTHER PUBLICATIONS

International Search Report and Written Opinion for PCT/US2014/037902, Sep. 30, 2014, 14 pgs.

Abts, D., et al., Age-Based Packet Arbitration in Large-Radix k-ary n-cubes, Supercomputing 2007 (SC07), Nov. 10-16, 2007, 11 pgs.

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, F, et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-Noc: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71 (5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

* cited by examiner

{cpua1, cpua2, cpua3, cpua4} ⇔ mema
{cpub1, cpub2, cpub3, cpub4} ⇔ memb

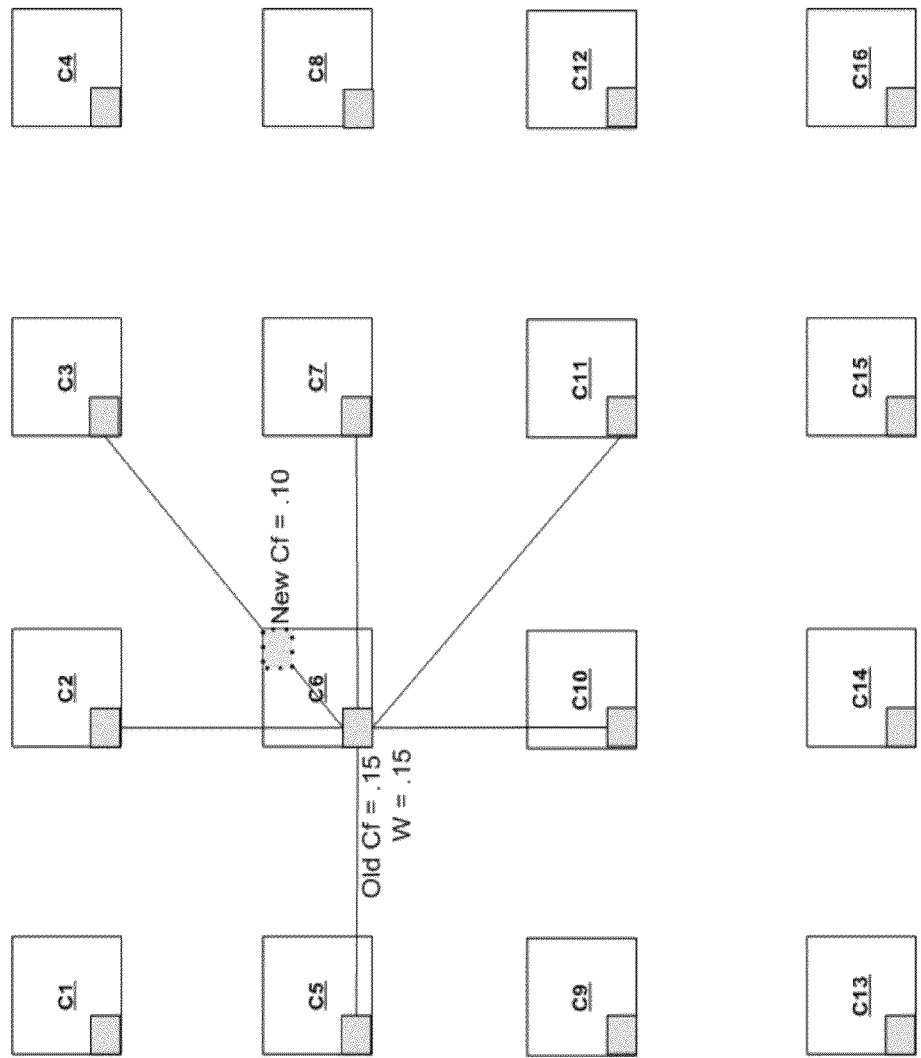

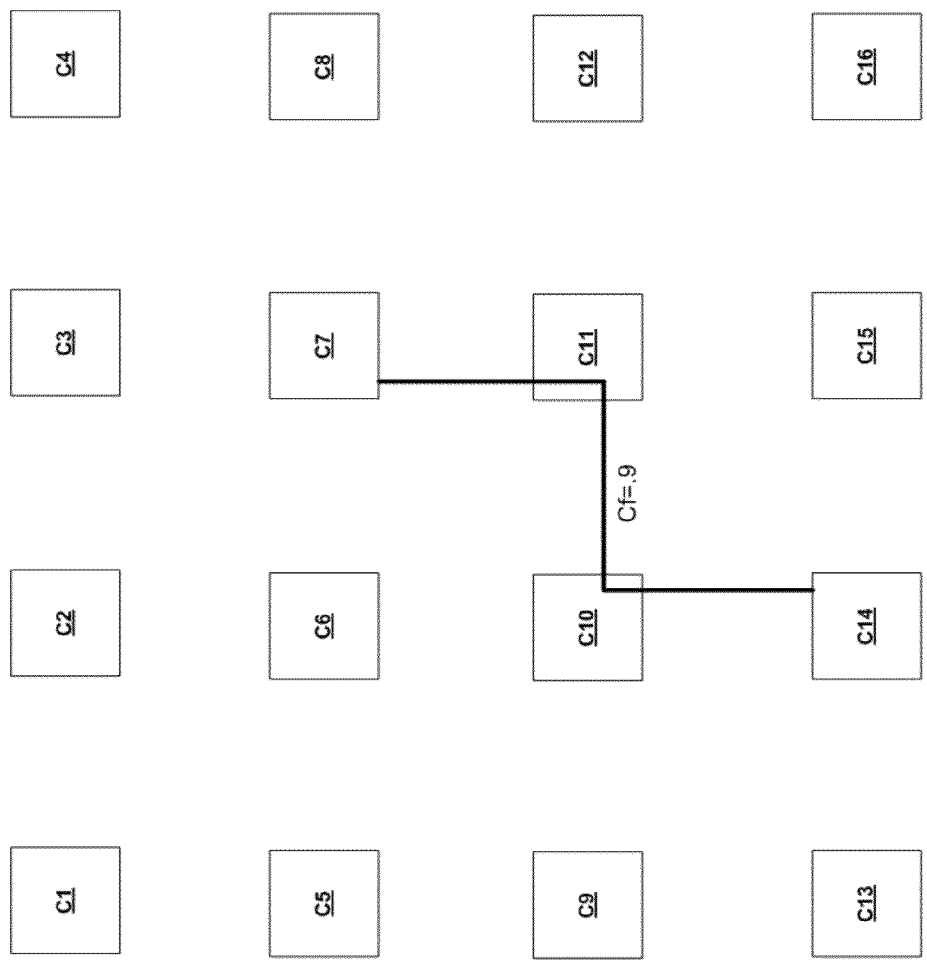

AUTOMATIC NOC TOPOLOGY GENERATION

BACKGROUND

1. Technical Field

Methods and example implementations described herein are generally directed to an interconnect architecture, and more specifically to automatically generate an optimized topology for a given SoC floorplan and traffic specification.

2. Related Art

The number of components on a chip is rapidly growing due to increasing levels of integration, system complexity and shrinking transistor geometry. Complex System-on-Chips (SoCs) may involve a variety of components e.g., processor cores, Digital Signal Processors (DSPs), hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Torus (as shown in FIG. 1(c)) are examples of topologies in the related art. Mesh and Torus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Torus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic flows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as aggregate bandwidth requirement of all traffic flows in the system, routes that are used by various flows, message size distribution, maximum channel width, among other such factors. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements. With such a large variety of design choices, determining the right design point for a given system remains challenging and remains a time consuming manual process, and often the resulting designs remains sub-optimal and inefficient. A number of innovations to address these problems are described in U.S. patent application Ser. Nos. 13/658,663, 13/752,226, 13/647,557, 13/856,835, 13/723,732, the contents of which are hereby incorporated by reference in their entirety.

Placing hosts/IP cores in a SoC floorplan to optimize the interconnect performance can be important. For example, if two hosts communicate with each other frequently and require higher bandwidth than other interconnects, it may be better to place them closer to each other so that the transactions between these hosts can go over fewer router hops and links and the overall latency and the NoC cost can be reduced.

Assuming that two hosts with certain shapes and sizes cannot spatially overlap with each other on a 2D SoC plane, tradeoffs may need to be made. Moving certain hosts closer to improve inter-communication between them, may force certain other hosts to be further apart, thereby penalizing inter-communication between those other hosts. To make tradeoffs that improve system performance, certain performance metrics such as average global communication latency may be used as an objective function to optimize the SoC architecture with the hosts being placed in a NoC topology. Determining substantially optimal host positions that maximizes the system performance metric may involve analyzing the connectivity and inter-communication properties between all hosts and judiciously placing them onto the 2D NoC topology.

Consider an example wherein there are 16 Central Processing Units (CPUs) and 2 memories that need to be placed in a 3×6 mesh organization. Let the first set of 8 CPUs communicate with the first memory MEM1 and the second set of 8

CPUs communicate with the second memory MEM2 as illustrated in FIG. 4(a). The CPUs and memories may be placed in a 3×6 mesh in sequential order as shown in FIG. 4(b); each host occupies a cell in the mesh and is directly connected to the router of the cell, without consideration of the traffic between various hosts. The inter-communicating hosts are placed far from each other, which leads to high average and peak structural latencies in number of hops. For instance, messages between hosts CPU1 and MEM1 need to go over 7 router nodes; message between hosts CPU13 and MEM2 needs to travel 6 hops as illustrated in the figure. Such long paths not only increase latency but also adversely affect the interconnect bandwidth, as messages stay in the NoC for longer periods and consume bandwidth of a large number of links.

One may place the above set of hosts in an organization as shown in FIG. 4(c), which can lead to significantly reduced average and peak structural latency values. As shown, the maximum structural latency in this organization between inter-communicating hosts is 3 router hops, and a large fraction of inter-communicating hosts are only 2 router hops apart. The host positions in FIG. 4 (c) can be achieved from FIG. 4(b) by repeatedly relocating certain hosts from their previous positions to new positions and in process swapping them with the hosts already present at the new positions. While it is relatively intuitive in this example to come up with optimal host positions, if the traffic profile consists of complex connectivity and highly asymmetric bandwidth and latency specifications between various hosts, then determining optimal positions for the hosts in a NoC topology may be much more difficult. In fact, it may be reduced to a known NP-hard problem. Thus, heuristic approaches must be used to determine optimal host positions in such settings.

In large-scale networks, efficiency is of main concern. Mechanisms such as machine learning approach, simulation annealing, among others, provide optimized topology for a system. However, such complex mechanisms have substantial limitations as they involve certain algorithms to automate optimization of layout network, which may violate previously mapped flow's latency constraint or the latency constraint of current flow. Therefore, there is a need for systems and methods that significantly improve system efficiency by accurately indicating the best possible positions and configurations for hosts and ports within the hosts, along with indicating system level routes to be taken for traffic flows using the NoC interconnect architecture. Systems and methods are also required for automatically generating an optimized topology for a given SoC floorplan and traffic specification with an efficient layout.

SUMMARY

The present application is directed to automatically determining topology choices and selecting an optimal design from among them by implementing a heuristic approach to determine optimal host position in such topology layout, so that the load on various channels may be controlled and to achieve efficiency, low latency, and high performance. Aspects of the present disclosure further relate to determining optimal positions of ports within hosts so as to enable low latency and higher message transmission efficiency between the hosts. In yet another aspect, a computationally efficient NoC topology is generated based on allocation of routers and NoC channels so as to identify most efficient routes for various system flows between hosts.

Aspects of the present application may include a method, which involves, automatically determining optimal positions, orientations, and configurations of hosts and/or ports within hosts in a SoC environment such that the optimal positions enable least latency and cost, high performance, and high bandwidth.

Aspects may also include a method, which involves, automatically generating NoC topology by establishing the number and configuration of routers needed for connecting the components, defining eligible communication paths and channels, which may include identifying the sequence of routers to be traversed to connect the aforementioned network of communicating components/IP cores in an optimized SoC environment.

Aspects may include a computer readable storage medium storing instructions for executing a process. The instructions may involve, automatically generating optimal positions, orientations, and configurations of various SoC components and ports within the components so that pre-defined and/or dynamically generated traffic system flows and allied constraints can be met and overall performance metric can be maximized. Furthermore, the instructions may also involve mechanisms for generating NoC topology by establishing number and configuration of routers to connect the components, defining eligible communication paths and channels, which may include identifying the sequence of routers to be traversed to connect the aforementioned network of communicating components/IP cores in an optimized SoC environment. Instructions may further include defining an optimized topology by mapping traffic flows and allocating resources such as bandwidth needed for NoC router nodes, and channels required between routers.

Aspects may include a method, which involves, for a network on chip (NoC) configuration, including a plurality of cores interconnected by a plurality of routers in a heterogenous or heterogenous mesh, ring, or Torus arrangement, automatically generating optimal positions, orientations, and configurations of various SoC components/IP cores and ports within the components so that pre-defined and/or dynamically generated traffic system flows and allied constraints can be met and overall performance metric can be maximized. The method can further include automatically tuning one or more critical NoC architectural parameters (such as frequency of operation, bandwidth of the links) so as to iteratively vary the number of data links between two routers to identify more optimal routes for a given system flow.

Aspects may include a system, which involves, a SoC topology module and a NoC topology module, wherein the SoC topology module is configured to generate optimal positions, orientations, and configurations of various SoC components/IP cores and ports within the components so as to enable low latency architecture, high bandwidth, and hence significantly higher performance. NoC topology module, on the other hand, is configured to establish the number and configuration of routers to connect the components, defining eligible communication paths and channels, allocating router and channel resources, which may include identifying the sequence of routers to be traversed to connect the aforementioned network of communicating components/IP cores in an optimized SoC environment. Further, sub-modules of each of the SoC topology module and the NoC topology module would be defined in detail in the below appended description.

The foregoing and other objects, features and advantages of the example implementations will be apparent and the following more particular descriptions of example implementations as illustrated in the accompanying drawings wherein like reference numbers generally represent like parts of exemplary implementations of the application.

BRIEF DESCRIPTION OF THE DRAWINGS

FIGS. 7(a), 7(b), 7(c), and 7(d) illustrate relocation and repositioning of a port of a given host in accordance with an example implementation.

DETAILED DESCRIPTION

Figure 1A:
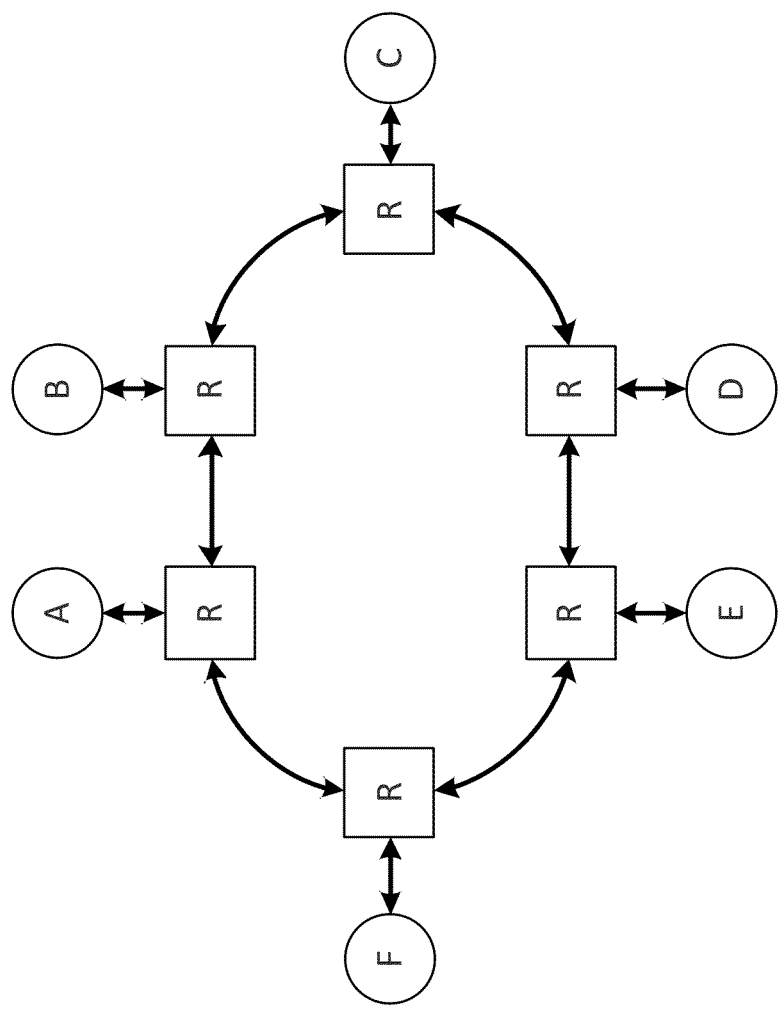
FIGS. 1(a), 1(b) 1(c) and 1(d) illustrate examples of Bidirectional ring, 2D Mesh, 2D Torus, and 3D Mesh NoC Topologies.
Figure 1B:
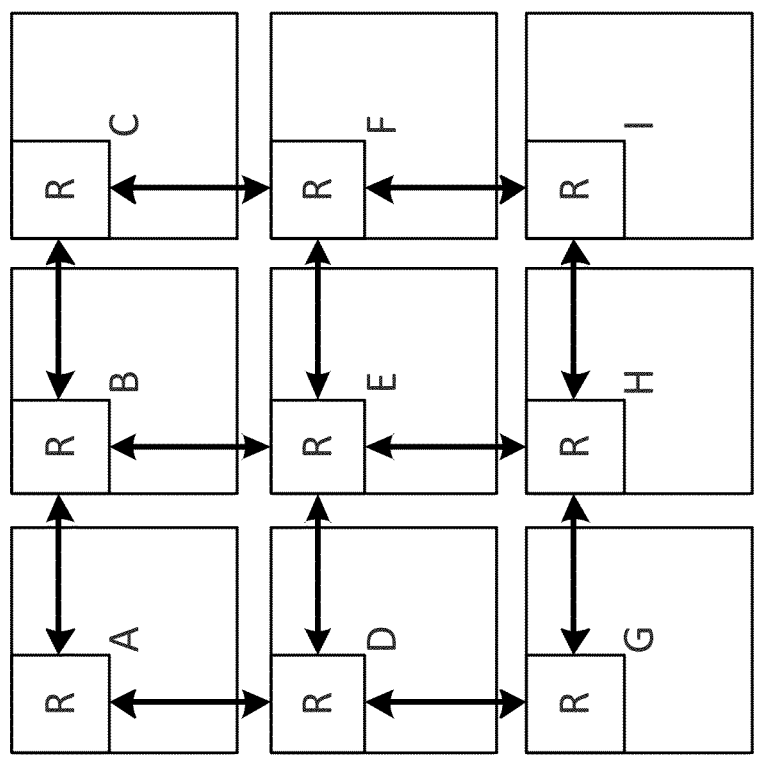
Figure 1C:
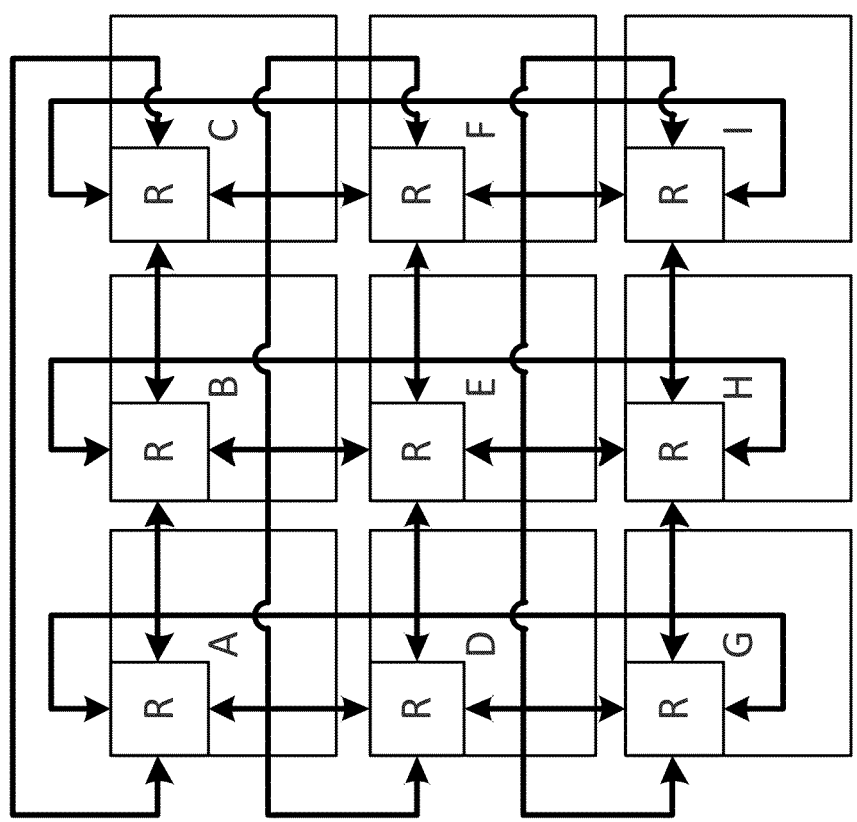
Figure 1D:
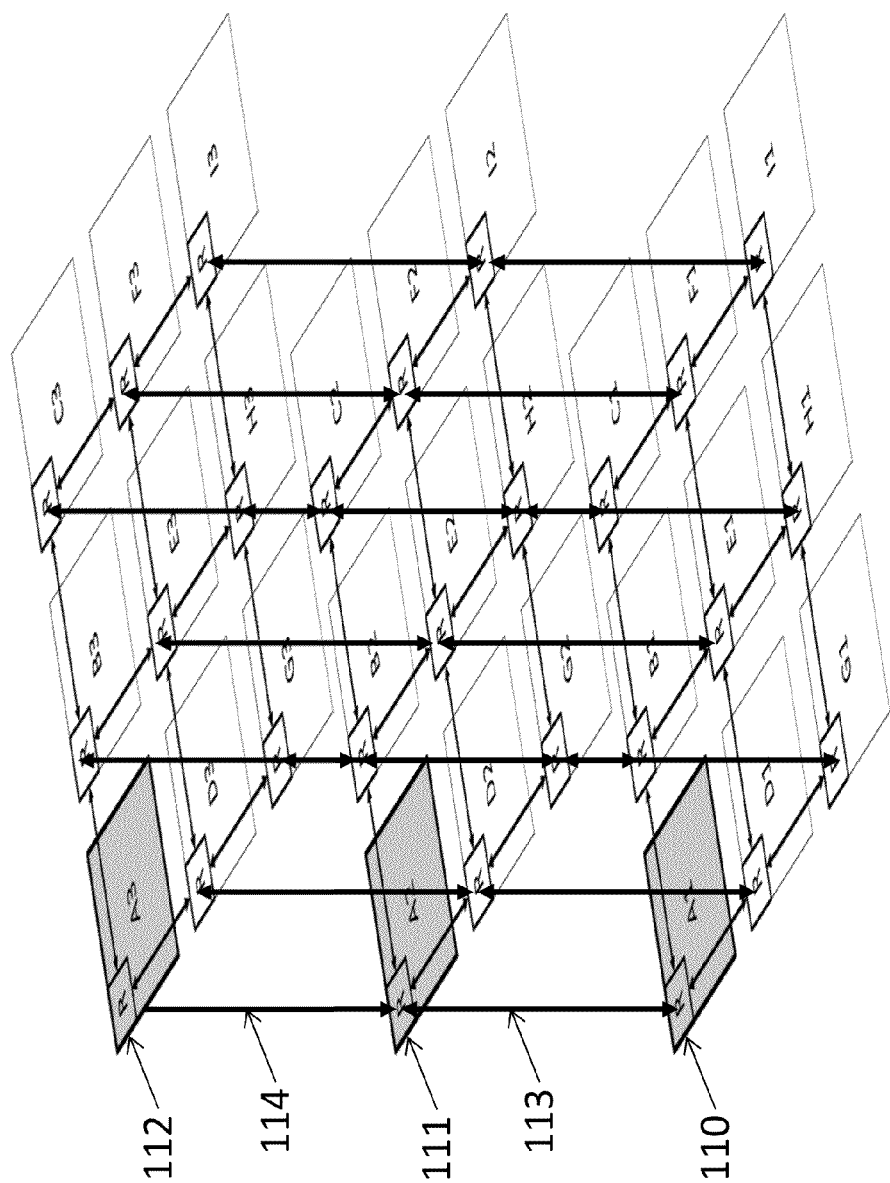
Figure 2A:
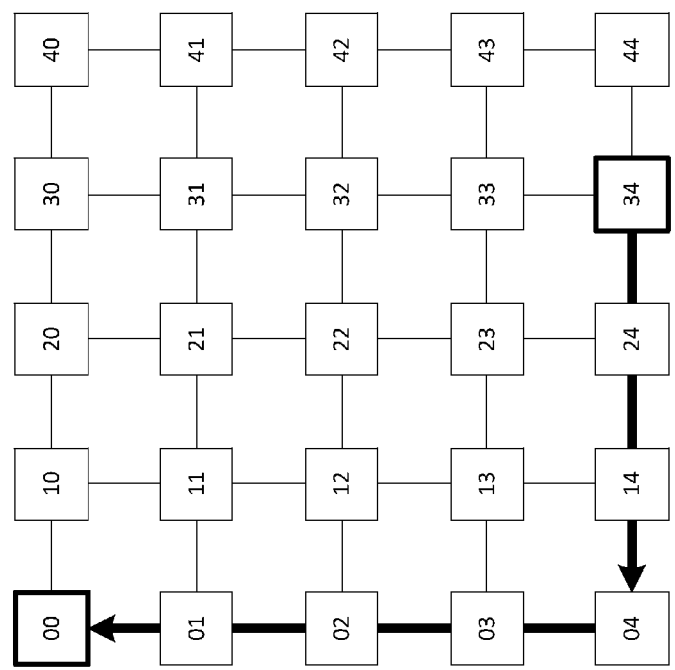
FIG. 2(a) illustrates an example of XY routing in a related art two dimensional mesh.
Figure 2B:
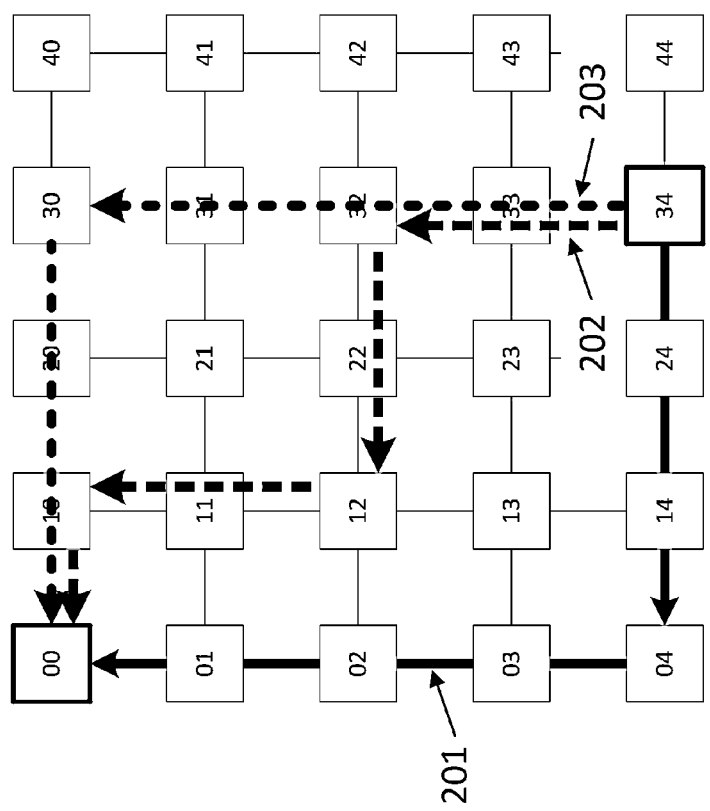
FIG. 2(b) illustrates three different routes between a source and destination nodes.
Figure 3A:
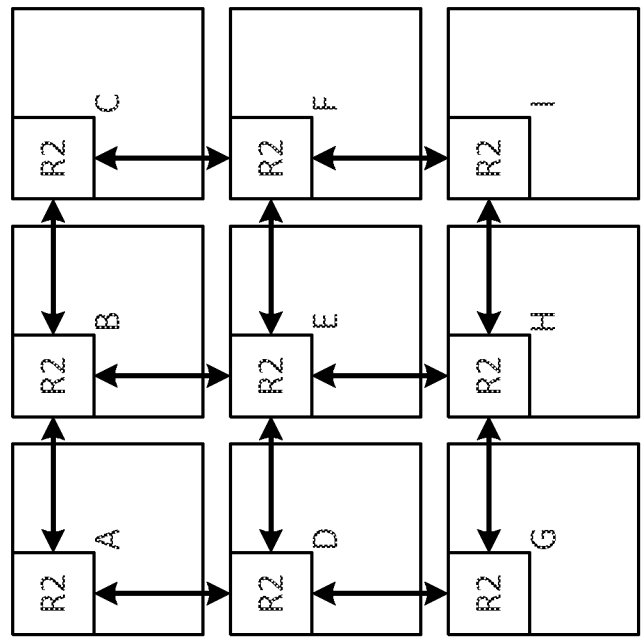
FIG. 3(a) illustrates an example of a related art two layer NoC interconnect.
Figure 3A:
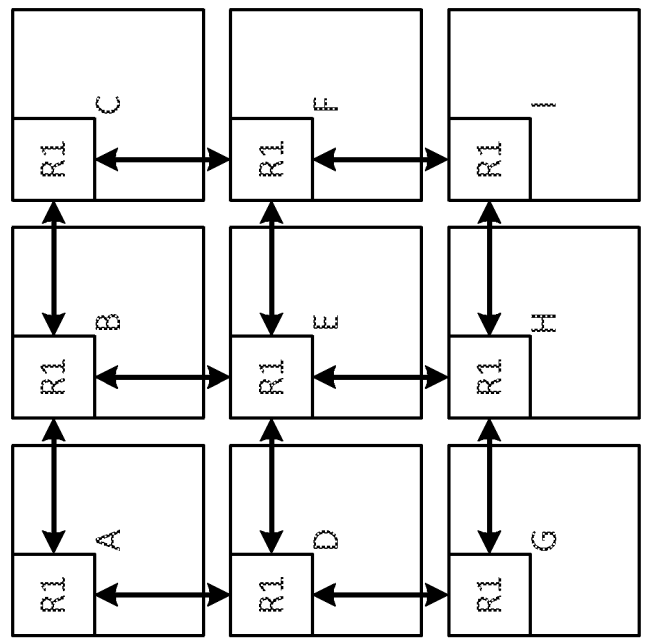
Figure 3B:
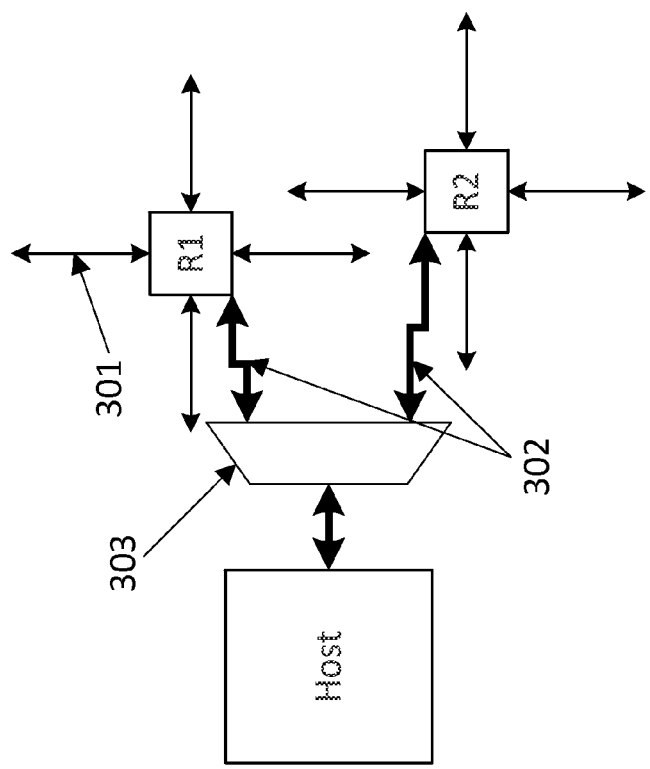
FIG. 3(b) illustrates the related art bridge logic between host and multiple NoC layers.
Figure 4A:
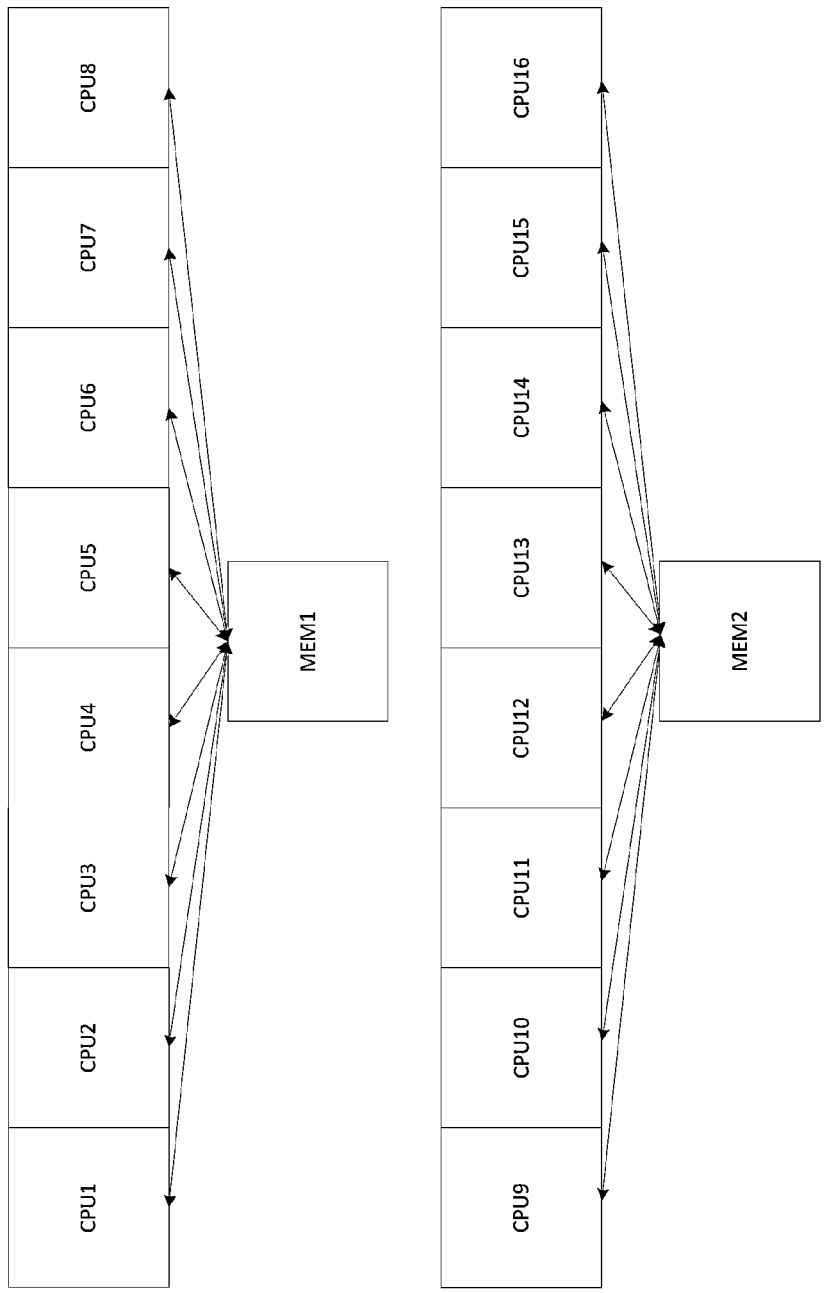
FIG. 4(a) illustrates number of system components and the connectivity between them.
Figure 4B:
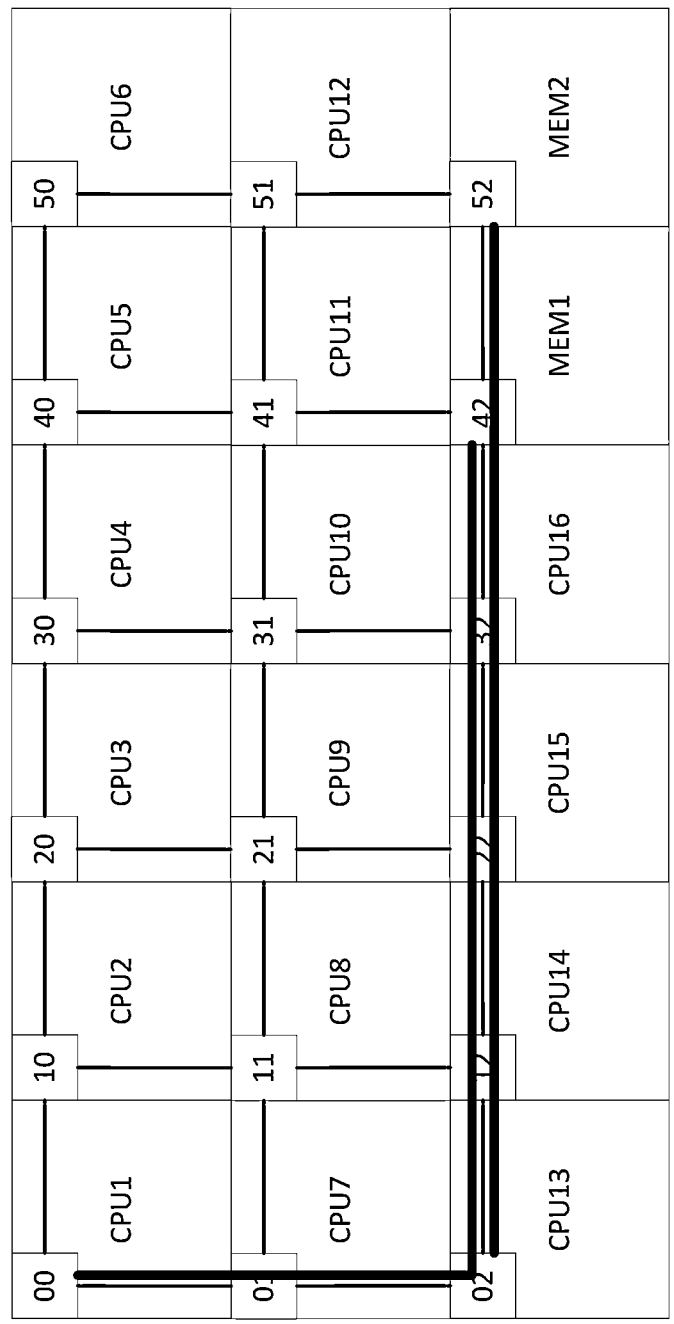
FIG. 4(b) illustrates a sample position of various hosts in a 3×6 mesh NoC topology.
Figure 4C:
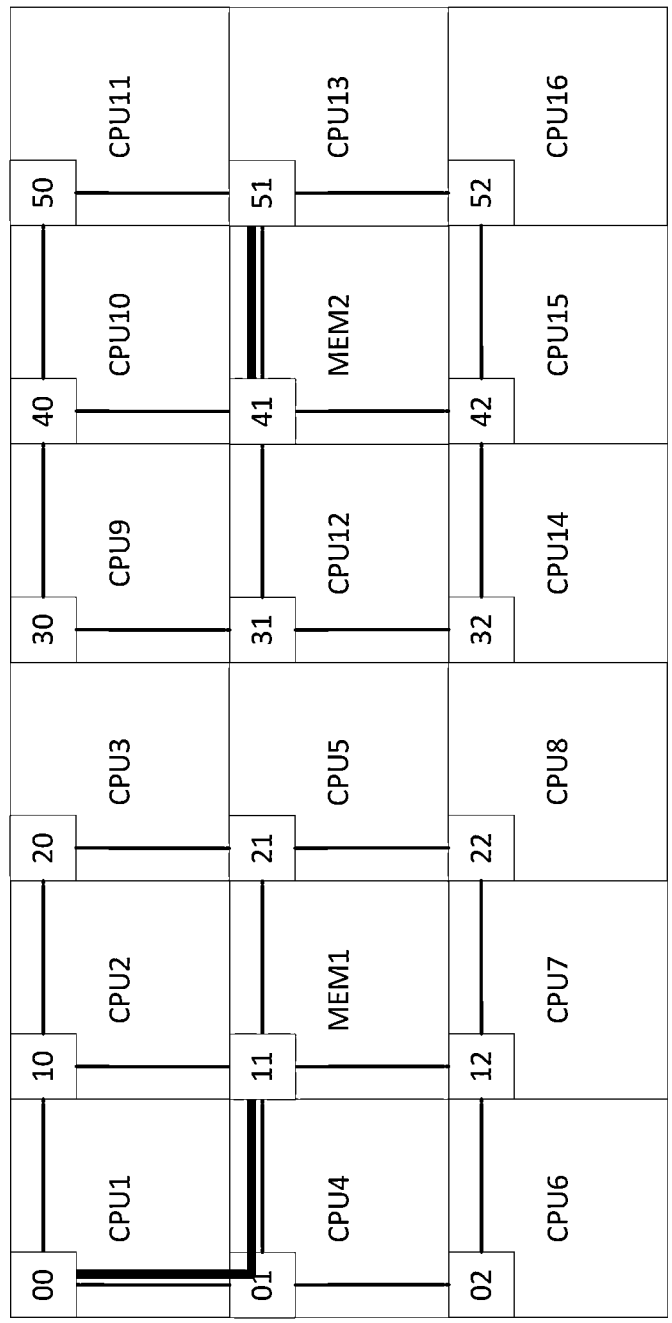
FIG. 4(c) illustrates a better position of various hosts in a 3×6 mesh NoC topology.

The following detailed description provides further details of the figures and exemplary implementations. Reference numerals and descriptions of redundant elements between figures are omitted for clarity. Terms used throughout the description are provided as examples and are not intended to be limiting. For example, use of the term "automatic" may involve fully automatic or semi-automatic implementations involving user or administrator control over certain aspects of the implementation, depending on the desired implementation of one of ordinary skill in the art practicing example implementations.

The topology of NoC interconnect to connect various SoC components can be used to achieve efficiency, low latency, and high performance. The number of topology choices for a NoC depends largely on the placement of various components on a chip and the connectivity requirements between these components. The example systems and methods are aimed at automatically determining these topology choices and selecting an optimal one from among them.

For some example implementations, a method to propagate flits using a fabric of a Network on Chip (NoC) is utilized. The method includes receiving the flits forwarded from an upstream router into an intended input virtual channel (VC) of a plurality of input VCs associated with an input port. The flits may be associated with packets originated from a first Intellectual Property (IP) core and to be forwarded to a second IP core. The flits can be stored in a virtual channel storage associated with the intended input virtual channel. Link width conversion may be performed based on the width of the input flits being different from the width of an output port.

Explanatory examples of systems and methods for data processing on NoC in accordance with implementations of the present application are described with reference to the accompanying drawings, beginning with FIG. 5(a).

Figure 5A:
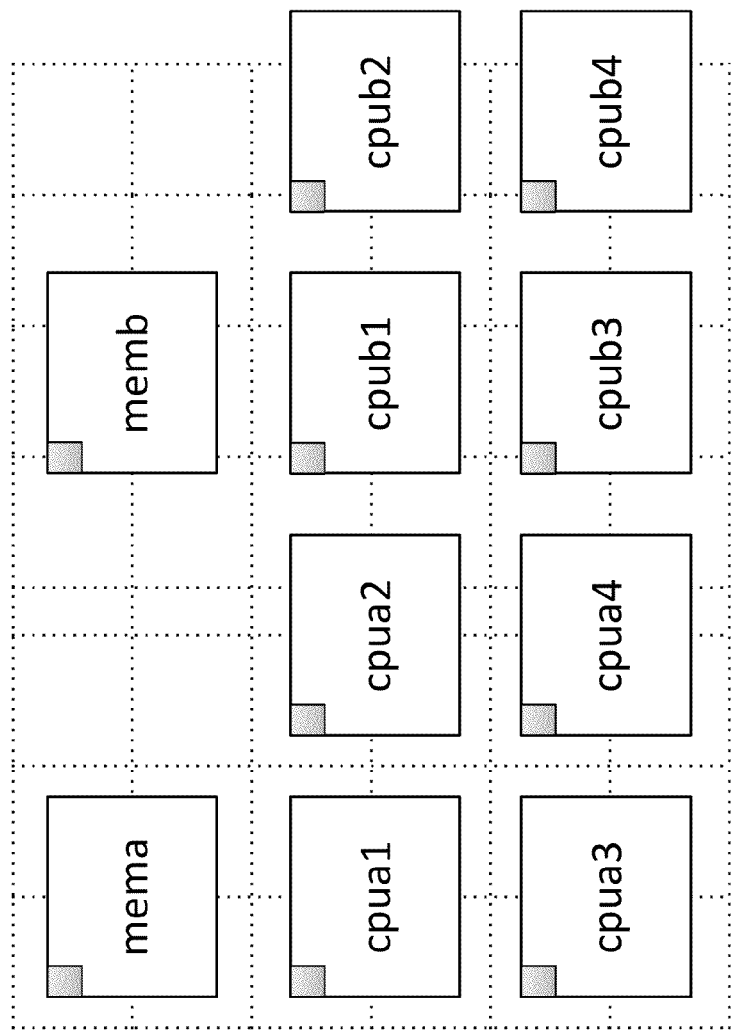
FIG. 5(a) illustrates SoC components and the connectivity specification.

The system illustrated in FIG. 5(a) illustrates a placement of various components/IP cores, interchangeably referred to as hosts hereinafter, along with respective ports of the hosts. Components illustrated in FIG. 5(a) include two groups of CPU's (cpua1-cpua4 and cpub1-cpub4), wherein each group of CPUs is operatively coupled with mema and memb respectively. FIG. 5(a) may include a NoC interconnect (not shown) composed of nodes/routers for processing communications from and to ports of various hosts. In an instance, the first group of four CPUs {cpua1, cpua2, cpua3, cpua4} communicates with memory mema and the next group of four CPUs {cpub1, cpub2, cpub3, cpub4} communicates with memb. As illustrated in FIG. 5(a), ports of each component/host can be placed initially or by default at the top left corner of the respective component and can be configured to receive and transmit packets/messages from and to other hosts through nodes/routers. It would be appreciated that ports may be configurable in a different position for each component and furthermore, each component can include a plurality of ports in a desired position/orientation/pattern. The groups of first and second CPUs can communicate to mema and memb respectively through any line of communication or path not depending on the other components interaction. Overall latency, NoC cost, and consumption of bandwidth can be reduced by keeping the design flow physically aware so that the resulting interconnect is as per the SoC floorplan. A number of NoC topologies, as mentioned below, can provide the needed connectivity.

Figure 5B:
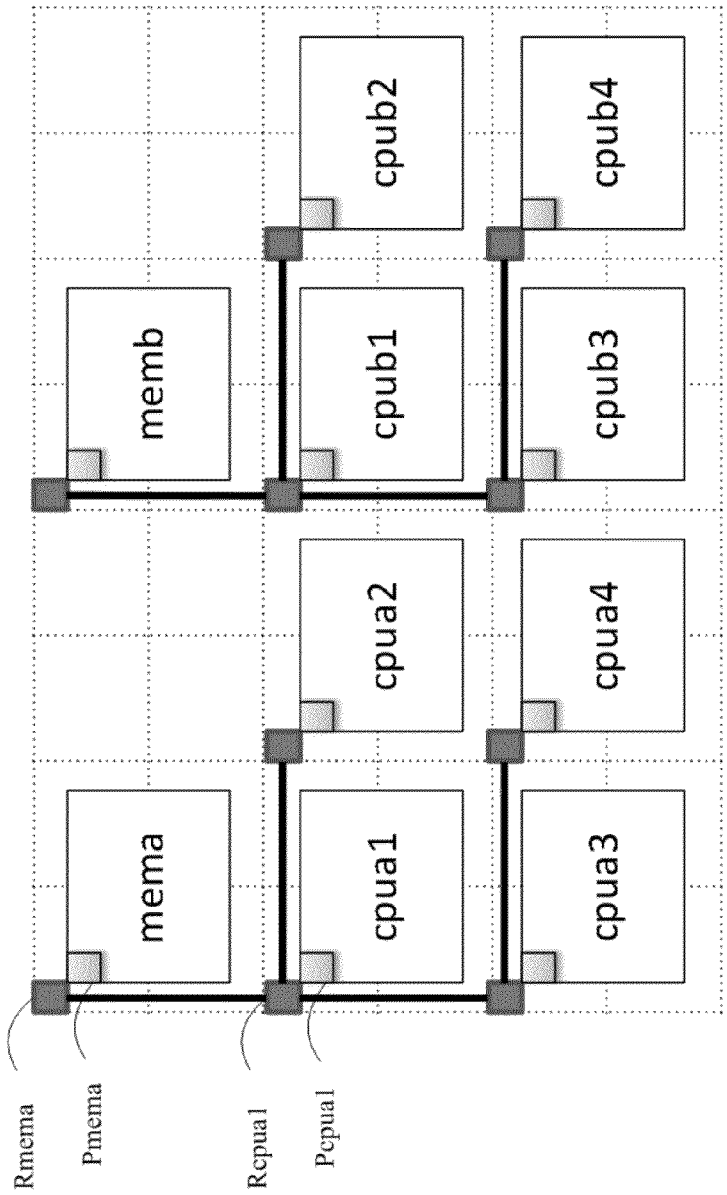
FIGS. 5(b), 5(c) and 5(d) illustrate an alternative topology for optimized port orientation and NoC interconnection.

FIG. 5(b) illustrates one possible type of an example topology including path communication between the ports and memory. Memory mema includes a port $P_{mema}$ that is operatively coupled with node/router $R_{mema}$. Likewise, each component can have multiple ports, one or more of which can be operatively coupled with a corresponding router/node for communicating through the NoC interconnect. Exemplary communication between the groups of components can be illustrated as below:

$$(\text{cpua1, cpua2, cpua3, cpua4}) \Leftrightarrow \text{mema} \quad (1)$$

$$(\text{cpub1, cpub2, cpub3, cpub4}) \Leftrightarrow \text{memb} \quad (2)$$

FIG. 5(b) depicts NoC routers such as $R_{mema}$ and $R_{cpua1}$, each of which is operatively associated with a port of a corresponding component. Lines between the routers are NoC links or channels, wherein each router/node receives packets from the component and/or the port it corresponds to (or transmits packets received from outside to the target port). Based on the address indicated in each packet, the routers forward the received packet to the port attached to it or to the port of another shared link.

FIG. 5(b) shows a shared link between memory and components that the memory can interact with. Lines between the routers are NoC links or channels for communication. For instance, messages from host cpua1 and to host mema need to go over 2 router nodes (first to $R_{cpua1}$ and then to $R_{mema}$ or visa-versa depending on the direction of message); and similarly, messages between hosts cpua2 and mema needs to travel 3 router nodes; messages between hosts cpua3 needs to travel 3 router nodes, and messages between cpu4 and mema needs to travel 4 hops as illustrated in the figure. Similarly, memb communicates with its group of components.

Figure 5C:
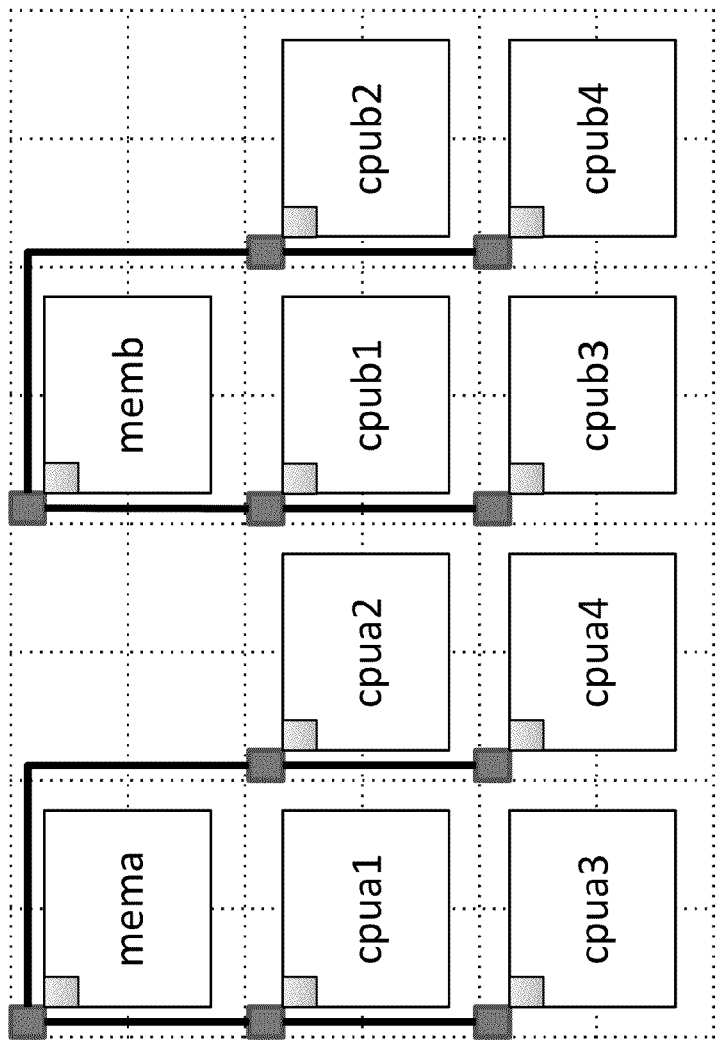

Another type of topology is illustrated in FIG. 5(c). Given the same positions for the ports at the top left corner of components, and the same grouping of components interacting with their corresponding memory as illustrated in FIG. 5(b), the NoC link or communication channel can be redesigned to a new topology as illustrated in FIG. 5(c). As this topology does not change the orientation of ports and/or hosts of the SoC environment, there is no SoC level change in topology and only the NoC interconnect topology is changed to allow a different and possibly more optimized route for the same traffic flows between components. For instance, messages between hosts cpua1 and mema now need to go over two router nodes; messages between hosts cpua2 and mema need to travel over two router nodes; messages between hosts cpua3 need to travel over three router nodes, and messages between cpu4 and mema need to travel over three hops as illustrated in the FIG. 5(c). The configuration of memb is similar with mema for the interactions with its corresponding components. Each of these topologies discussed in FIG. 5(a) and FIG. 5(b) have identical latency characteristics, however the wire lengths in the two topologies are different. The wire length in FIG. 5(c) is greater when compared to FIG. 5(b), which may hinder into speed of communications along the channels. Therefore, FIG. 5(c) and FIG. 5(b) illustrate a change in NoC level topology by using different routes for fulfilling the same system traffic flows, wherein as described below, each such route can be evaluated with respect to a cost function to determine a more optimal route for the concerned system traffic flow.

Figure 5D:
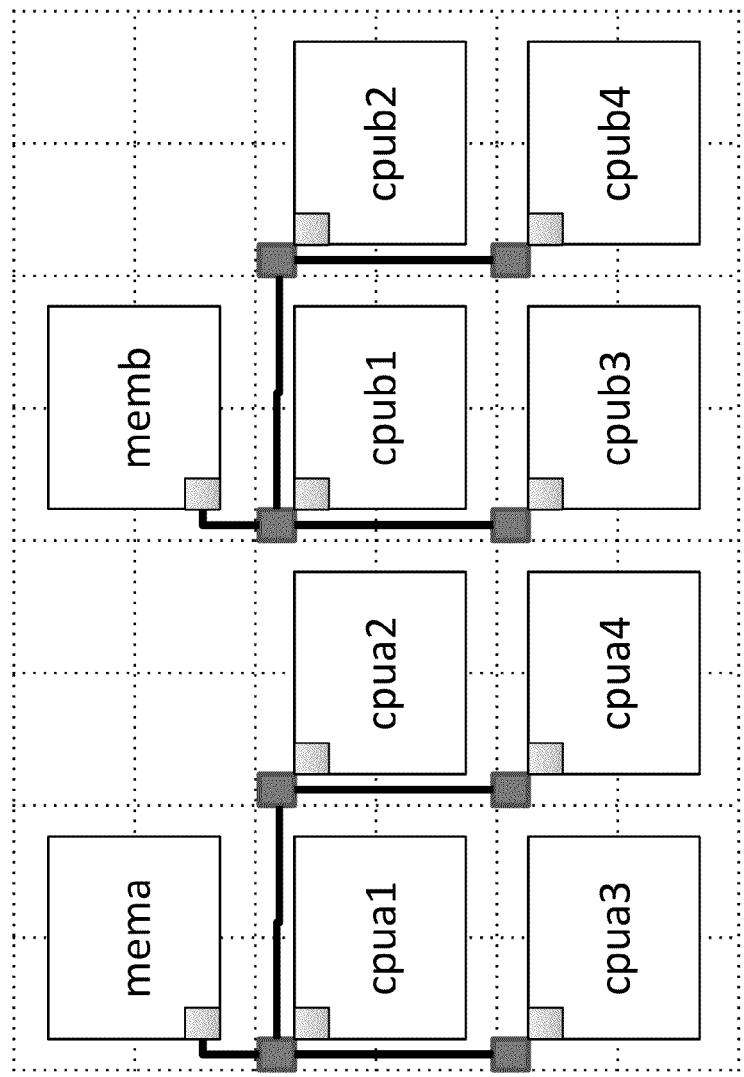

In more complex systems, there are often a number of topologies possible as the components and corresponding router and ports increase, along with the various cost, performance and latency characteristics. The topology can be redesigned according to the needs of the system, which may depend on reducing the interconnect bandwidth and latency or keeping average global communication latency as an object function. One type of optimized topology orientation is illustrated in FIG. 5(d), which illustrates a topology with reduced wire length and reduced latency and interconnect bandwidth. In the example implementations, the ports and routers corresponding to the memories have flexible orientations and can be placed as shown in FIG. 5(d). In such a case, port $P_{mema}$ can be shifted and/or re-positioned to a new location in the memory component mema, wherein the port, as shown in FIG. 5(d), has been shifted from the top left to the bottom left orientation. With this change in orientation of ports of a given host/component, messages between hosts cpua1 and mema need to go over one router node; messages between hosts cpua2 and mema need to travel over two router nodes; messages between hosts cpua3 need to travel over two router nodes, and messages between cpu4 and mema need to travel over three hops as illustrated in FIG. 5(d). Therefore, the configuration improves on the performance of the SoC environment and architecture. The configuration for memb is similarly affected for its interactions with its corresponding components. In this example, with the change in port configuration and position, latency can be reduced as the router corresponding to the memory reduces the number of hops between the memory and its components, which also results in reduced interconnect bandwidth, thereby reducing cost. As illustrated in FIG. 5(d), each router/node can include multiple ports and therefore each port of a router can be operatively coupled to and configured with a port of a host/component, giving rise to situations wherein each router and ports thereof are operatively coupled with a plurality of hosts in the SoC architecture.

Each of the above explained topologies can have identical latency characteristics, however the wire lengths in the two topologies shown in FIG. 5(b) and FIG. 5(c) are different. In complex systems, often a number of topologies are possible with various cost, performance and latency characteristics. The first step in determining an optimized NoC topology is therefore to determine the right positions of various components on a SoC and then subsequently determine the most optimal position of ports within the hosts. Once the hosts and ports are more optimally and efficiently configured in the SoC, the possible different routes for one or more system flows can be evaluated and selected to define the NoC interconnect.

Optimized topology can be determined by computing the positions for various components on a SoC. Furthermore, more optimal positioning of components on SoC can be determined by various techniques, which may involve machine learning or simulated annealing. Machine learning approach can begin with a parameterized synthesizable Routing Table Lookup (RTL) specification for a given router micro-architecture, i.e., a configurable router micro-architecture specification, which can be used to generate the actual router implementations under different configuration parameters. By using a small subset of selected configurations, each configuration can be run in sets through a target ASIC implementation flow, including timing-driven RTL synthesis and timing-driven placement and routing, to obtain a detailed physical layout for each router instance.

Simulated annealing approach, on the other hand, can be explained as a random search technique, which may provide improved results in coping with complex combinatorial problems. Simulated annealing can be applied for solving combinatorially large optimization problems. With simulated annealing, the minimization of a global objective function can be approached directly.

To determine the placement of various components, the shape and size of the components may need to be considered to ensure that components do not overlap with each other. In some component designs, ports may be fixed at specific orientations, while in others, the ports may have some flexibility to be at any orientation. For such systems, the cost function can be adjusted to reflect the orientation of fixed ports. For ports with orientation flexibility, an appropriate port position can be computed and the final port position can be configured to connect the port to the nearest NoC router. In the previous example systems of FIGS. 5(a)-5(d), if mema and memb have flexibility of any port orientation, a more optimized port orientation can then be designed, as shown in FIG. 5(d).

In an example implementation of an automatic NoC topology design, the orientation of ports of hosts and the host placement can be computed together, which is described below. Although both the "positioning hosts" and "positioning ports within hosts" are explained as occurring in a single run or simultaneously, both can be carried out differently or one can be omitted if executed independently. For instance, instead of changing the positions of hosts within the SoC architecture, their positions can be maintained and the implementation thereby executes only for realigning and/or orienting the ports within the hosts to make a more optimal SoC topology. The algorithm can be changed to allow swapping of hosts with each other as well as relocation of ports within hosts. If there are multiple ports within a host, they may also be swapped with each other.

Figure 6:
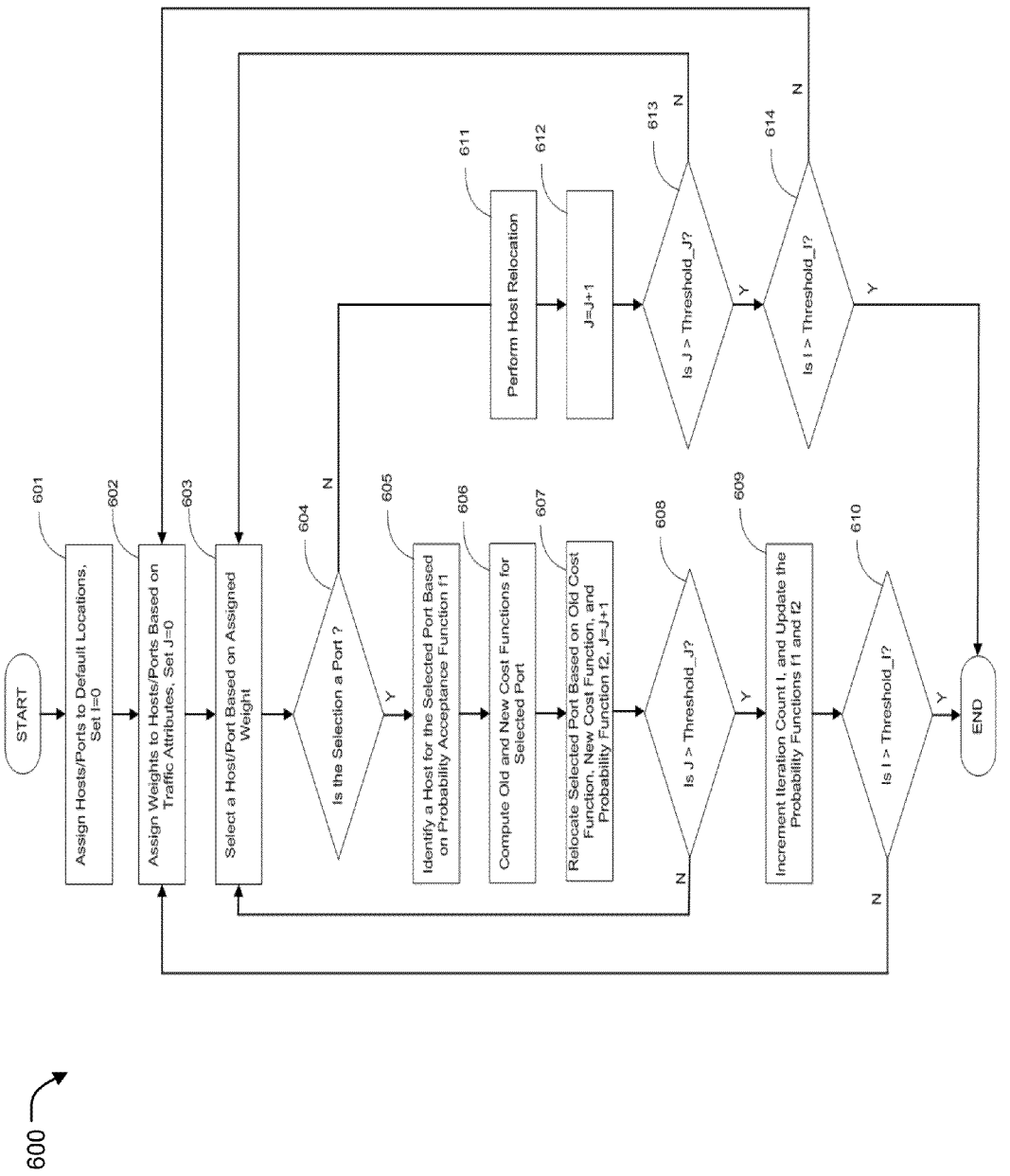
FIG. 6 illustrates an example flow diagram showing positioning and orientation of components and ports therein, in a SoC environment.

FIG. 6 illustrates a flowchart 600 showing a method of generating a SoC topology by computing more optimized positions of hosts and/or ports resulting into reduced latency and reduced interconnect bandwidth. In an example implementation, as depicted in FIG. 6, at 601, hosts and ports are assigned to their initial/default locations and orientations in the NoC. Once positioned in default locations, ports of the host/components can be operatively connected with their corresponding/nearest routers. Iteration counter I, which can indicate the number of times the optimization of SoC components and respective ports would take place, can be set to 0 and a threshold value (e.g., Threshold_I) can be defined to indicate the number of times an already optimized set of components and ports would be optimized. For instance, once all identified and eligible hosts and ports are positioned by the example implementations, another round of optimization can be carried out to ensure that the best possible optimization of SoC topology is generated.

At 602, a weight is assigned to each host and port thereof based multiple parameters. In an example implementation, the weight can be computed based on attributes such as cost functions, latency, interconnect bandwidth, traffic attributes, among other like parameters. According to one example implementation, instead of assigning weights to each port and/or host, the weights can be computed for and assigned to a subset of ports/hosts. In an example, a host and/or a port that has the highest latency can be assigned the lowest weight and the host/port with the lowest latency and highest bandwidth can be assigned the highest weight. The weight assignment can also be opposite wherein a host/port with the higher latency is allocated a higher weight. In an example, the weight for each host/port xi can be computed as:

$$\text{weight}(xi) = \text{bandwidth}(xi)/\Sigma\text{bandwidth}(xi) \quad (3)$$

At 603, based on the weights assigned to one or more hosts and ports, a host or a port within a host (e.g., x1) can be selected for relocation consideration. Assuming that x1 is the port with lowest weight assigned compared to other ports in a system (e.g., due to having the highest latency), relocation of the port within the host may be conducted to improve the efficiency of the SoC and also enhance the latency and bandwidth-based performance. In an example implementation, a weight threshold can also be defined by the system, wherein the implementation is carried out only for those hosts/ports that have their weights lesser than the defined weight threshold. According to another example implementation, hosts and/or ports can also be identified for potential relocation until a given number count (e.g., J) is reached, wherein J=0 in the first iteration. For instance, if there are five hosts in a system and each host has two ports, there are a total of 15 components/ports whose relocations is possible (five components and ten ports), and therefore J can indicate the number of times the relocation of these components/ports needs to be executed based on the weight of the component/host or the port. Besides the example implementations described above, other implementations can also be carried out to select the ports and/or hosts that need to be relocated and the number of times the process needs to be carried out.

At 604, an identification is conducted as to whether a port has been selected for relocation or a host has been detected. When a host has been selected for re-orientation (N), relocation of the host to a more suitable position in the grid/SoC architecture can be conducted. This is described in U.S. patent application Ser. No. 13/779,618, which is incorporated herein by reference in its entirety for all purposes.

On the other hand, if a port has been selected for relocation or repositioning, at step 605, a host, selected from a group of hosts operatively coupled with the port, is identified based on a probability acceptance function f1. For instance, if port x1 of a host h1 is operatively coupled with hosts h3, h7, h9, h18, and h32; one of the hosts 3, 7, 9, 18, and 32 is selected based on the function f1. Function f1 can be defined based on multiple traffic level parameters including, but not limited to, frequency of interaction with the concerned host, latency, bandwidth considerations, and other preference attributes depending on the desired implementation. Such parameters can also be combined in weighted or any other desired and known manner to obtain the function f1, on the basis of which one host that is most preferable to the port x1 in context can be identified. For instance, if the "frequency of interaction" is determined to be the most important factor for identifying a host, host h7, for instance, can be selected for the concerned port x1. Once a host for the concerned port x1 in context has been identified, a potential new location/position for the port x1 can be determined based on the position and other attributes of the identified host.

In an example implementation, using a probabilistic function f1 may introduce some randomness in determining new orientation of the port x1, which may avoid local minima. For instance, the probabilistic function f1 can be configured to indicate that host h7 should be selected n % of the time, h3 should be selected m % of the time, and so on.

According to one example implementation, function f1 may be devised such that the function gives preference to those hosts with which port x1 communicates more frequently. For instance, if port x1 talks with "n" hosts named h1_1 to h1_n, and the communication bandwidth requirements between these hosts are B(x1, h1_i), i=1 to n, then the probability with which a host from among h1_1 to h1_n is selected can be given by:

$$P(h1\_i) = B(x1, h1\_i)/\Sigma B(x1, h1\_i) \quad (4)$$

There may be latency requirements as well, wherein certain hosts may need to communicate with x1 with lower latency than the others. If there is such latency constraint given by L((x1, h1_i), i=1 to n, then the probability function f1 may be adjusted to accommodate both bandwidth and latency as shown below.

$$P(h1\_i) = (B(x1, h1\_i)/\Sigma B(x1, h1\_i)) \times (\Sigma L(x1, h1\_i)/L(x1, h1\_i)) \quad (5)$$

According to one example implementation, a weighted probabilistic function f1 can also be incorporated in which bandwidth and latency will be given different weight values reflecting their importance in a given system. Accordingly, any other traffic or non-traffic based parameters can also be selected for defining the function f1 and selecting a host for the port x1 in context.

At 606, a cost function can be computed for the port x1. The cost function can be computed for each port for any given position based on one or more traffic parameters such as latency, bandwidth, among other parameters. In the present context, the cost function can initially be computed for the initial position of the port (say left bottom of the component) and then for the proposed new position of the port (say top right of the component).

At 607, a check is performed for whether the position of the port x1 is to be changed from the initial position to the newly proposed position. This step can be checked based on the old cost function (when the port x1 is in the initial position), the new cost function (when the port x1 is in the newly proposed position), and a probability function f2, wherein in an example implementation, the function f2 can be configured to compare the old cost function with the new cost function.

If the new cost function is lesser than the old cost function, then the port is relocated. The relocation of the port x1 to the new location is thereby less expensive in terms of latency and other performance level traffic attributes. Even if the new cost function is more expensive than the old cost function, the probability function f2 can allow relocation of the port x2 y % of the time. Therefore based on the new cost, the previous cost, and the probabilistic acceptance function f2, relocation and/or re-orientation of the port x1 can either be accepted or rejected based on a relocation decision (e.g., accept x % of the time, where x is the probability indicated by the probabilistic function, etc.). According to another example implementation, function f2 may be devised in a number of ways. For instance, if the relocation of port reduces the cost function, the relocation may always be accepted. On the other hand, if the relocation increases the cost, the relocation may be accepted with a certain probability function. The probability function may be devised based on the type of optimization. For instance, in a simulated annealing based approach, the acceptance probability may depend on a time-varying parameter called "temperature", which controls whether a relocation that increases the cost function is accepted or rejected. The algorithm begins iterating the inner loop at higher temperature and progressively reduces the temperature at each pass of the inner loop. At higher temperature levels, a relocation that increases the cost function is accepted with higher probability than at lower temperature levels, thus allowing higher chances of moving away from local minima at higher temperatures. As the system cools down, (i.e. temperature drops), movements that increase the cost function are accepted with lower probability. At the start of each outer iteration loop, the temperature may be restored at a higher level, thus creating multiple passes of the cooling process in the inner loop. The function f2 may be defined as:

$$P(\text{relocation})=1/(1+\exp((\text{cost(old)}-\text{cost(new)})/\text{cost(initial)} \times \text{temp})) \quad (6)$$

where
P(relocation) indicates the probability of whether the relocation is accepted or not
cost(old) is the cost function before relocation,
cost(new) is the cost function after relocation;
cost(initial) is the initial system cost function; and
temp is the current temperature level.

Initial temperature level may be chosen at 1 or some other value, and reduced in a geometric progression after every fixed number of passes of the inner loop. Temperature may be reduced in some other manner as well. The inner loop may continue until the temperature reaches some pre-determined lowest allowed value T(min). This algorithm is based on machine learning and simulated annealing and generally determines optimal locations for ports and hosts in the system.

At 608, a check is conducted for whether the value of J counter has reached its threshold. At 609, if the value of J has reached the threshold (Y), the value of I counter is incremented along with modification of the functions f1 and f2. Based on the new functions f1 and f2, cost functions of the ports and hosts are also modified, resulting in modification of the weights allocated to the hosts and ports of the hosts. At 610, a check is conducted for whether the counter I has reached its upper threshold Threshold_I, wherein if the threshold Threshold_I has not been reached (N), the flow goes back to 602, wherein new weights are assigned to one or more hosts and ports thereof based on traffic parameters including but not limited to latency, bandwidth, among other like parameters. If, on the other hand, the threshold of counter I has been reached (Y), the flow stops. If the value of counter J has not reached its threshold (N), say Threshold_J, the flow moves back to 603, wherein a new host or a port is selected for evaluation of a possible relocation to another position. The new port, (e.g., x2) can be identified for relocation based on its weight (for instance, the weight of x2 can be higher than x1 but lower than all other hosts and/or ports).

In one example implementation, inner and outer loop iteration counters J and I respectively can also be factored into the weights of the ports/hosts to better control the host selection at 603 for the flow of FIG. 6.

Figure 7A:
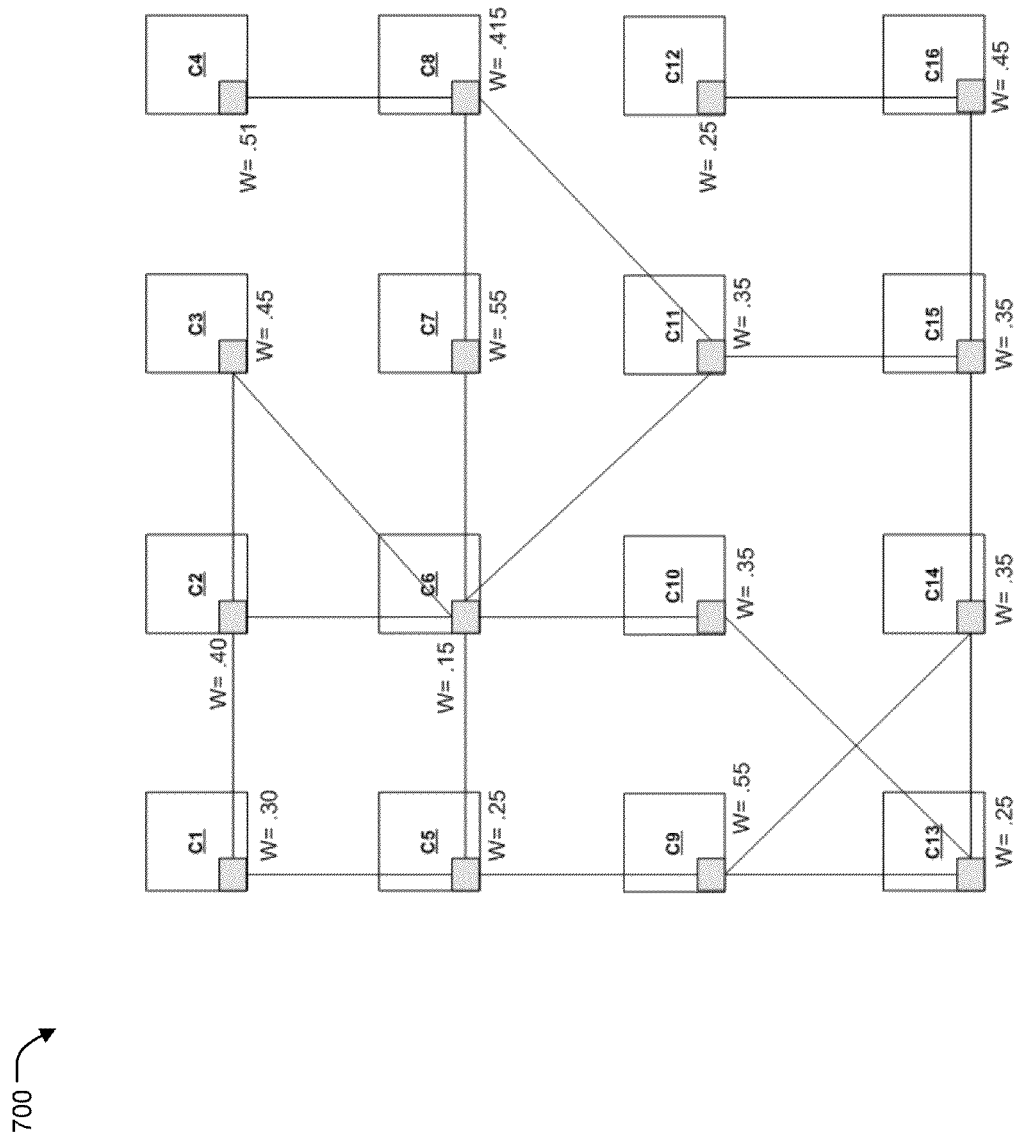

FIGS. 7(a), 7(b), 7(c), and 7(d) illustrate relocation and repositioning of a port of a given host in accordance with an example implementation. FIG. 7(a) illustrates multiple components/hosts C1-C16, which are operatively coupled with one or more other components/hosts. For instance, host C1, through its respective port, is coupled with ports of hosts C2 and C5. Similarly, C6 is coupled with the ports of C5, C10, C2, C3, C11, and C7. In an example implementation, each port can be assigned a weight as illustrated in FIG. 7(a). In the present example, the ports are relocated within their respective hosts and the positions of the hosts are static. Therefore weights are only assigned to the ports.

The port of host C6 has the smallest weight of 0.15 among all of the other ports, which may signify that the port of host/component C6 has the highest latency and therefore can be picked up for a potential relocation (in accordance with the flow at 603 for FIG. 6). Selection of the port of component C6 to be relocated is illustrated in FIG. 7(b).

Figure 7B:
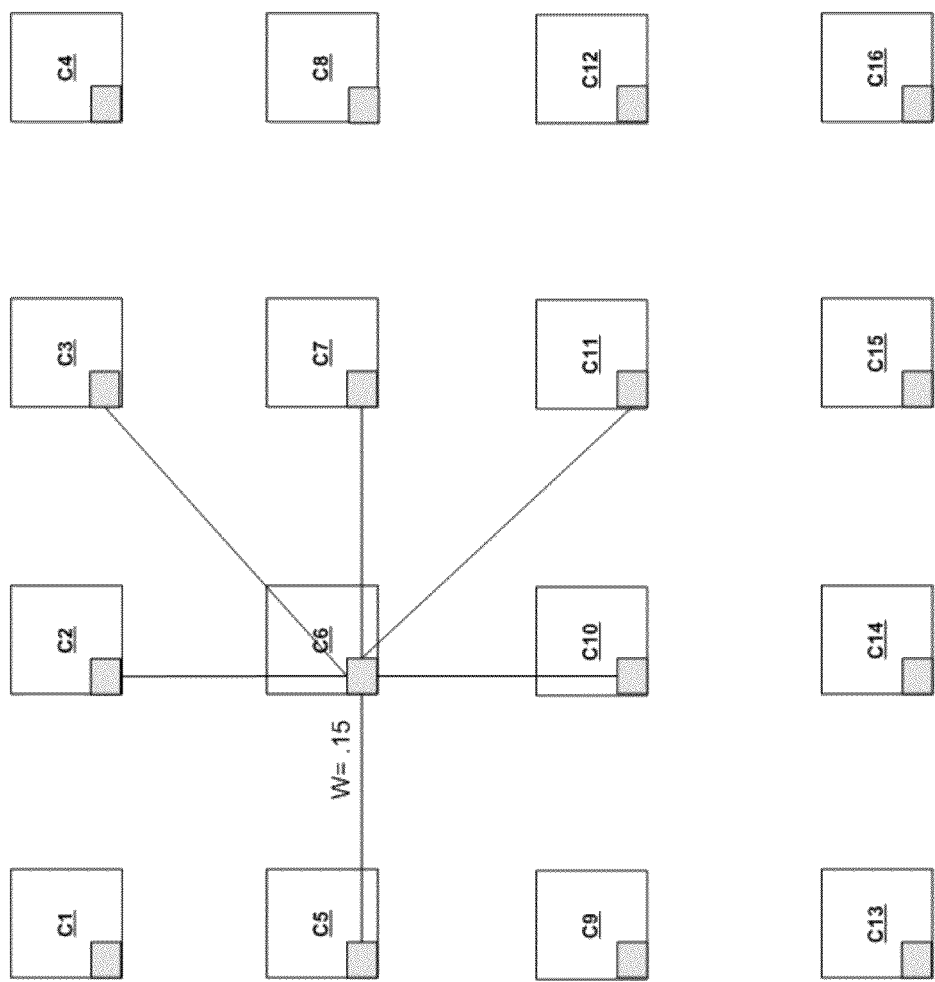

FIG. 7(b) illustrates all the hosts that the port of C6 is operatively coupled with, which include C2, C3, C5, C7, C10, and C11. Based on the probability function f1 as defined in the flow of FIG. 6, one host can now be selected, which the present example assumes to be C3. Once the host C3 has been selected (in accordance with the flow at 605 of FIG. 6), a cost function for the port of C6 is computed assuming that relocation of port of C6 is proposed.

Figure 7D:
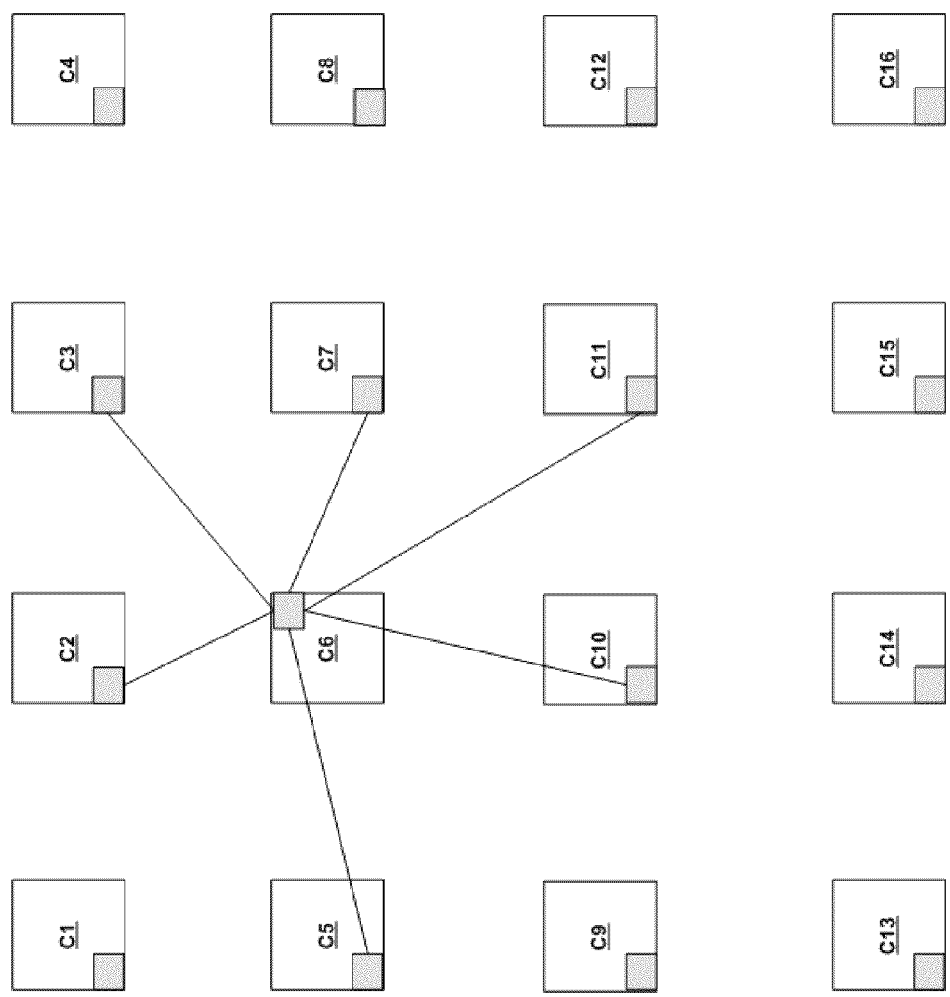

FIG. 7(c) illustrates the old cost function of the port of C6 before the relocation, which is computed as 0.15, and further computes the new cost function assuming relocation of the port of C6 to top right of the host C6. As illustrated in FIG. 7(c), the new cost function is 0.10, and therefore, in accordance with probability function f2, as the value from new cost function is less than the value from the old cost function, the port can be relocated as illustrated in FIG. 7(d), with renewed connections of the relocated port of C6 with all other operatively coupled hosts. This process can be continued until the time the most optimized set of positions for components and ports have been achieved.

According to one example implementation, once the host positions and orientations are determined in the SoC, the automatic NoC topology generation process can then include allocation of routers and NoC channels to form the NoC topology. The routers can be instantiated to connect the ports of the hosts forming the first set of arbitration points, wherein the ports are connected to the nearest routers. After the router-port assignment, there may be one router per host port. In a grid based design methodology, the routers may be instantiated in a grid cell in which the ports reside. Subsequently, additional routers and NoC channels can be allocated to provide connectivity such that a more optimized NoC topology automatically forms. When system traffic flows (message flow from one host/component to another host/component forms one system traffic flow) are mapped to the NoC grid at certain routes, whenever multiple flows intersect each other, an arbitration logic may be needed, and a router may therefore be instantiated if it does not already exist at the grid cell where the intersection occurs. Also new NoC channels can be allocated along the route if they do not already exist. Therefore, the key in determining the optimal NoC topology is to select an optimal route for all traffic flows in the system so that there are minimum number of intersection points and/or minimum number of channels while satisfying all traffic requirements.

According to another example implementation, a probability function can be calculated either considering one function based on latency, interconnect bandwidth, traffic flow or a summation of all functions, for a newly optimized position of the port or the host depending on the desired implementation.

Figure 8:
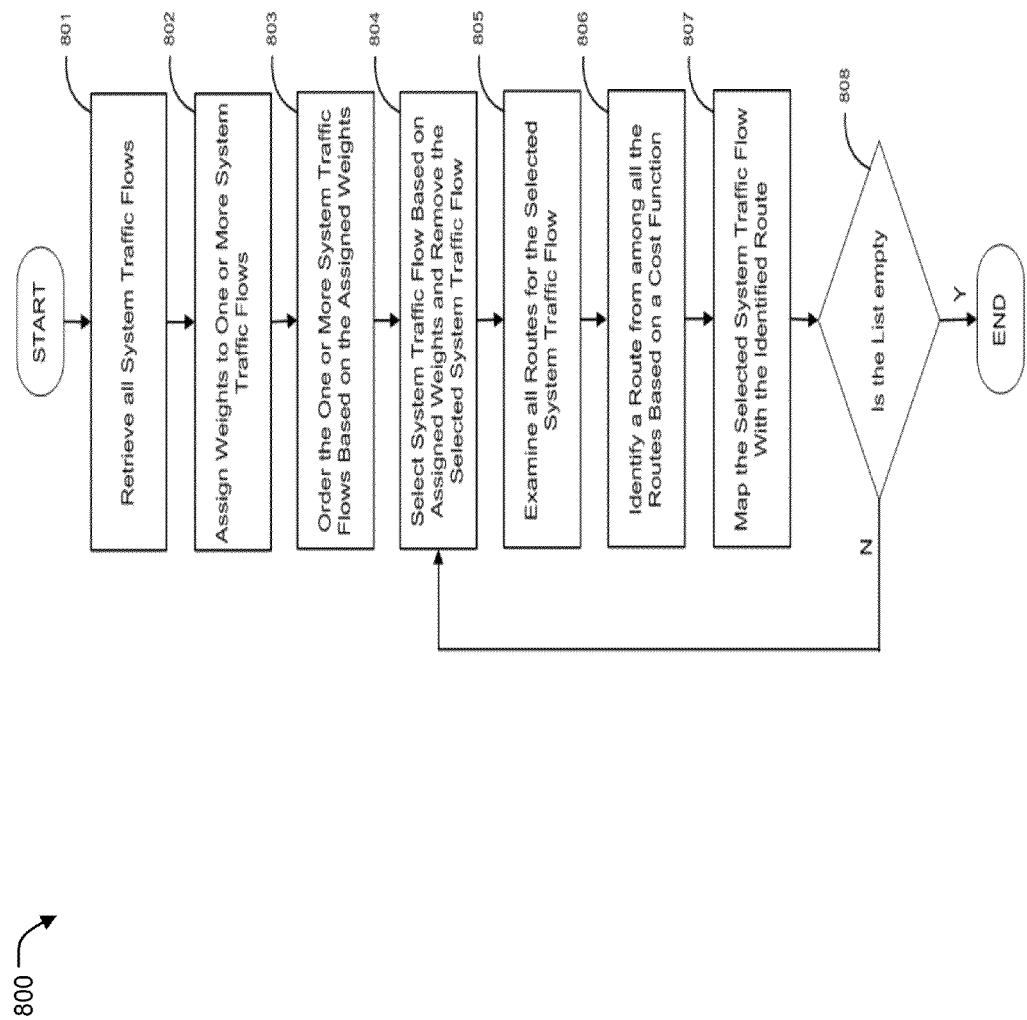
FIG. 8 illustrates an exemplary flow diagram showing identification of an optimal route for a given system traffic flow.

FIG. 8 illustrates a flow diagram 800 to identify possible and optimal eligible routes for one or more system traffic flows. An SoC architecture can include multiple components operatively coupled to each other through one or more routers/nodes. At 801, all system traffic flows for which optimal routes are to be identified can be retrieved. At 802, one or more system traffic flows can be assigned a weight function, wherein the weight can be assigned to each traffic flow based on traffic parameters such as latency, bandwidth, among other like parameters. For example, normalized latency can be computed for one or more system traffic flows so that flows with higher normalized latency may be processed before the flows with lower normalized latency as their flow optimization has higher priority. In this example, the flow that experiences maximum latency has the lowest weight and therefore needs to be processed first. At 803, the one or more system traffic flows are ordered based on the assigned weights. In an example implementation, the ordering can be done such that the flow with the lowest weight (highest latency) is on the top of the list.

At 804, the system traffic flow on the top of the list can be picked up and removed from the list. However, any other reorganization of the flows can also be done (e.g., the flow having highest latency can also be put at the bottom of the list). In another example implementation, the weight is not based on the latency at all and some other parameter can considered while assigning the list. The example implementations identify the system traffic flow that is to be optimized with the optimal route first.

At 805, all possible routes for the selected system traffic flow can be identified and examined. For instance, there might be numerous routes for a system flow that is initiated from a CPU to a cache memory, wherein each route can involve multiple routers and interconnections therein. From among all the possible routes, based on one or more parameters such as number of hops involved, component interaction attributes, and other traffic/component/node level attributes, a plurality of routes can initially be selected as being eligible. In an example implementation, a route is eligible if after mapping the flow along the route and instantiating all the needed routers, none of the previously mapped flow latency constraints or the latency constraint of the current flow are violated. In another example implementation, all the routes identified for a given system traffic flow can be identified.

At 806, a route is selected based on its cost function from the eligible set of routes. Each route can therefore be associated with a cost function that is defined by one or more parameters, such as routers involved, channels involved, latency considerations, bandwidth attributes, and other parameters. For instance, the cost function can be based on the number of hops involved in the respective route and the route with the lower number of hops has the lowest value of the cost function. Furthermore, multiple parameters can also be combined in a defined ratio to form a weighted set of parameters that constitute the cost function. In an example implementation, the route with the lowest cost function can be selected as the optimal route for the system traffic flow in context.

At 807, the selected route is mapped with the system traffic flow and properties of the route as well as of the system traffic flow including of the components involved in the flow are updated. When a flow is mapped, routers may need to be instantiated at the source and destination nodes and at all nodes where the flow merges with some previously mapped flows coming in or going out (or both) in different direction than the present flow, if there is no existing router to facilitate the present flow.

At 808, after the mapping of the selected optimal route for the identified system traffic flow, a check is conducted to determine if all the system traffic flows have been mapped. If all the flows have been mapped (Y), the flow ends, otherwise (N) the flow moves back to 804 and continues to identify optimal routes for other system traffic flows.

Another example implementation may augment the previous procedure by combining bandwidth analysis and optimization of NoC channels as well as the virtual channel allocation for the flows as they are being mapped. Such a design may involve: 1) Automatically classifying a plurality of system traffic flows into various classes depending on the latency requirements of the flows and the positions of the source and destinations components of the flows, 2) Identifying eligible routes for a given traffic flow identified from the plurality of system traffic flows; 3) Determining if the route has available virtual channels for deadlock avoidance and isolation and available bandwidth for this flow and then only considering those routes that have bandwidth and virtual channels available; 4) From among all the routes, performing load balancing in terms of bandwidth, virtual channel in addition to the number of hops, and latency in deciding the route for the concerned traffic system flow; and 5) Mapping the flow to the route and updating all data-structures to track the bandwidth of various channels and virtual channel dependencies and usage.

The resulting procedure is similar to the flow shown in FIG. 8 except that the eligibility criteria of the routes will be different. A number of other implementations may be used such as considering the routes randomly, or considering mapping the system traffic flow at all eligible routes and then selecting the best route among them. A few examples of related bandwidth aware and virtual channel aware mapping of flows to multiple NoC layers and selecting the most optimal route are described in U.S. patent application Ser. No. 13/752,226 and the same is hereby incorporated by reference in its entirety for all purposes.

In another example implementation, topology generation algorithms may also aim at reducing the global latency in terms of the number of hops of all system traffic flows in absence of any latency constraints. Additionally, the cost of the NoC in terms of router nodes and channels may also be used as a cost metric based on which various routes for various flows will be selected and routers and channels will be allocated. The cost function of FIG. 8 can be devised accordingly based on desired optimization goals of either reducing the latency, or reducing the NoC cost or a combination of both.

In another example implementation, the flows can all be mapped first and relocated to alternative routes while removing the routers and channels from the earlier route if possible (e.g., no other flows are present there) and then adding them to the new route if required. Subsequently, cost of the new system is computed and based on acceptance criteria/cost function, the relocation is either accepted or rejected. The acceptance criteria might be made probabilistic to get some randomness in the relocations. A probabilistic acceptance function may accept those relocations that reduce the cost with higher probability than those that increases it. An example acceptance function in a simulated annealing approach can be:

$$P(\text{relocation})=1/(1+\exp((\text{cost(old)}-\text{cost(new)})/\text{cost (initial)} \times \text{temp})) \quad (7)$$

wherein P(relocation) indicates the probability of whether the relocation is accepted or not,
cost(old) is the cost function before relocation,
cost(new) is the cost function after relocation,
cost(initial) is the initial system cost function, and
temp is the current temperature level.

The initial temperature level may be set at 1 or some other value, and then reduced in a geometric progression after every fixed number of relocations. Temperature may be reduced in some other manner as well. Relocations may be carried out until the temperature reaches some pre-determined lowest allowed value T(min). Alternative acceptance functions may be used and the total number of relocations may be determined in various different ways.

Alternative implementations of the above algorithm may also put constraints, such as using only routers of certain radixes in the generation of the interconnect. In this case, route for various flows are chosen and arbitration points or routers are allocated such that the radix constraints are satisfied. For example if a constraint is used such that only routers of radix 3 (i.e. 3 ports) can be used, then the resulting NoC topology with the above implementations may be a full or a partial ring, as each router can connect to at most one host and two additional routers to the left and right. One may decide to use routers of higher radixes in which case the resulting NoC topology may be non-mesh or Torus topology. For example, if one is allowed to use NoC routers whose radix is equal to the total number of host ports in the SoC, then a single router may be sufficient and the resulting interconnect may look like a crossbar.

Alternative example implementation of automatic NoC topology generation may determine multiple NoC layers each with different topologies and map different traffic flows on different NoC layers. Such techniques are described, for example in U.S. patent application Ser. No. 13/856,835, hereby incorporated by reference in its entirety.

To summarize the proposed example implementation of automatic NoC topology generation, first the position of various SoC components and ports within the components is automatically determined so that certain performance constraints are met and overall performance metric can be maximized. Furthermore, the example implementation automatically determines the NoC topology by mapping the traffic flows and allocation needed between NoC router nodes and channels between them. Since the generation and mapping are based on probabilistic methods, the entire process may be repeated multiple times to iteratively find the best solution. While this is an example implementation of automatically computing the NoC topology, a number of alternative example implementations are possible. The concept of automatically determining an efficient NoC topology to design an interconnect solution and meet performance constraints is included in the focus of the example implementations.

Figure 9A:
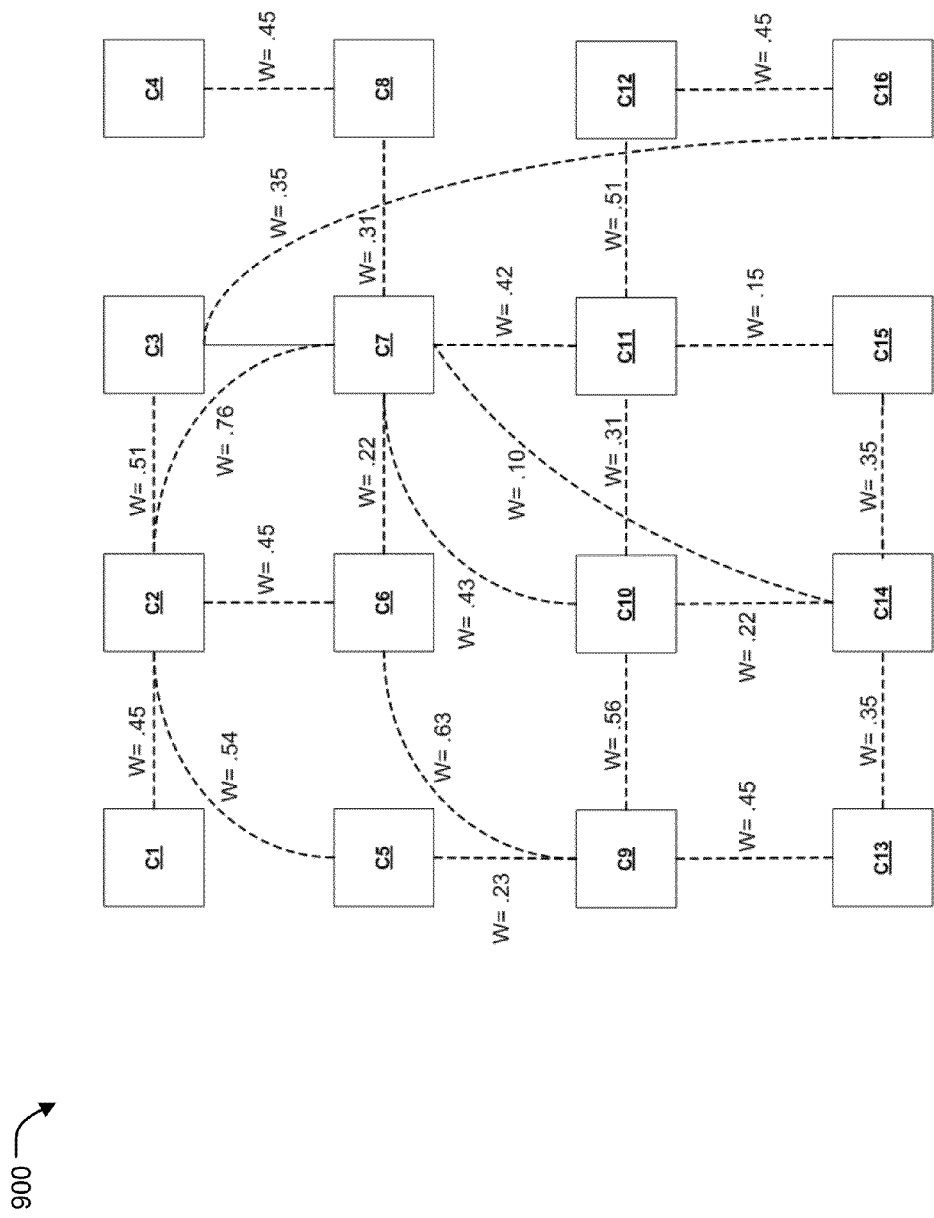
FIGS. 9 (a), 9(b), 9(c), and 9(d) illustrates identification of a more optimal route for a given system traffic flow, which in turn is selected from a plurality of traffic flows having different weights.
Figure 9B:
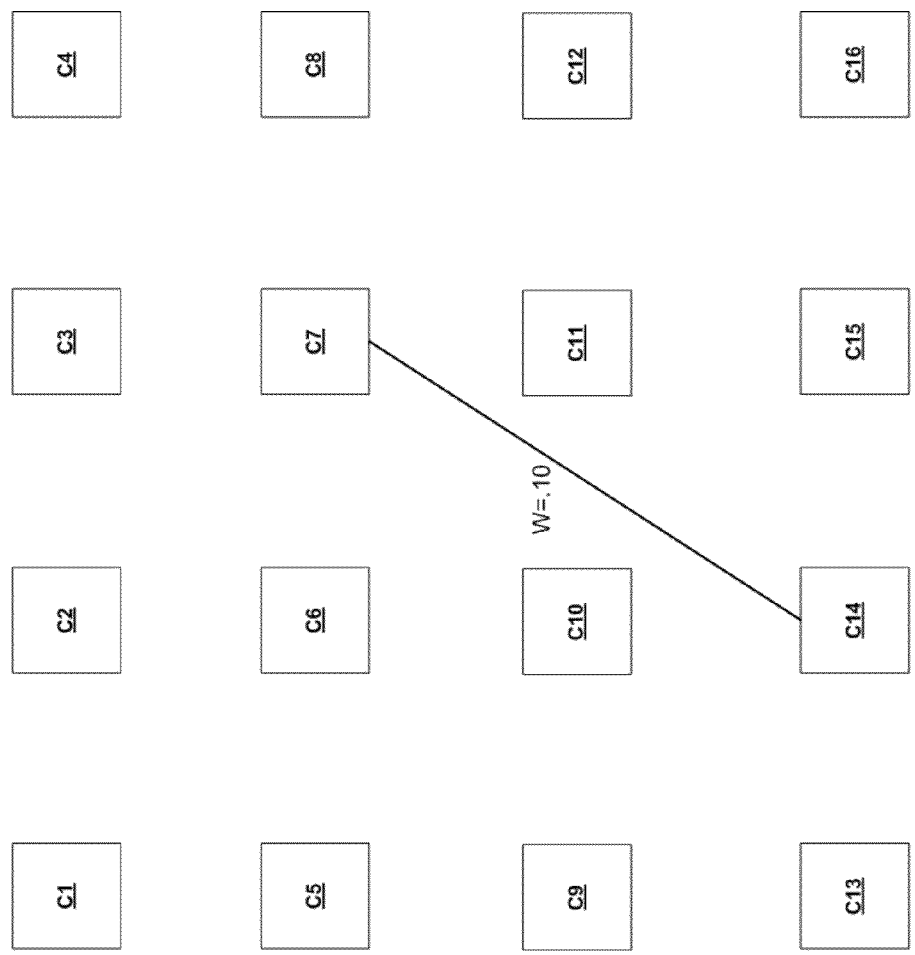
Figure 9C:
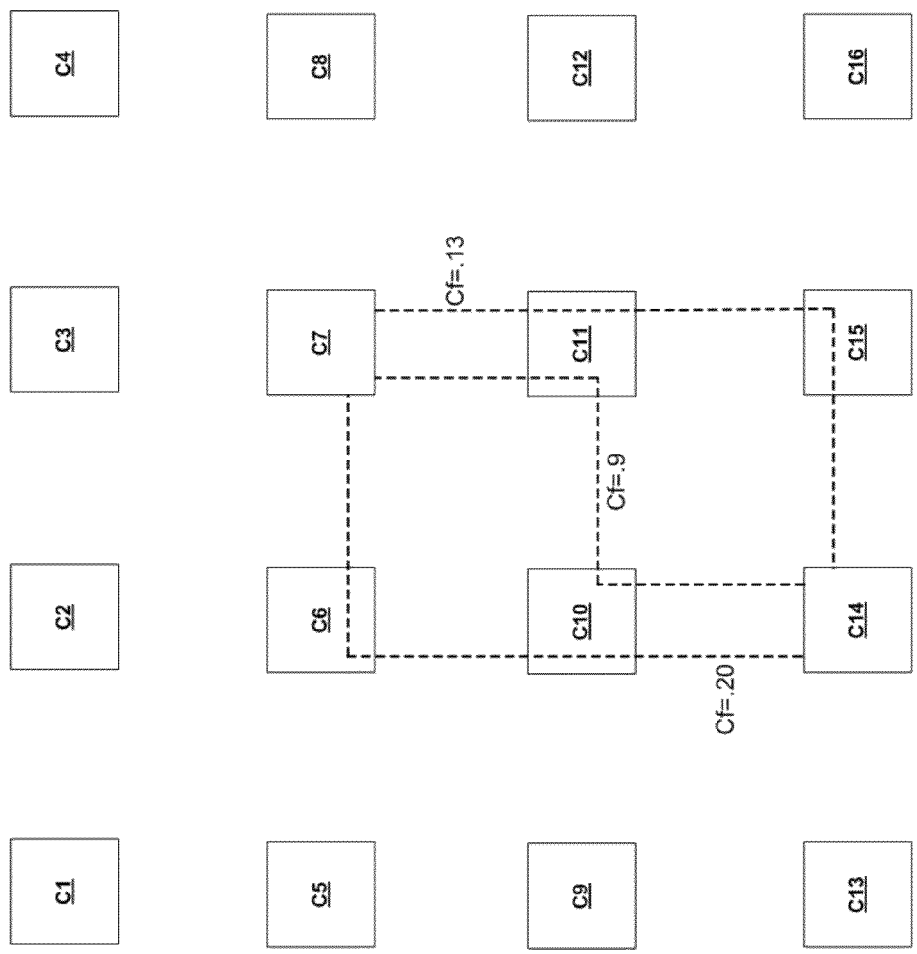

FIGS. 9 (*a*), 9(*b*), 9(*c*), and 9(*d*) illustrate identification of a more optimal route for a given system traffic flow, which in turn is selected from a plurality of traffic flows having different weights. As illustrated in FIG. 9(*a*), the example SoC environment includes 16 components that may be operatively coupled to one or more of each other. Components can include memory, cache memory, CPU, processor cores, DSPs, hardware accelerators, memory and I/O, while Chip Multi-Processors (CMPs) may involve a larger number of homogeneous processor cores, memory and I/O subsystems.

FIG. 9(*a*) illustrates multiple system traffic flows that are present and desired to be mapped to more optimal routes, wherein each flow represents a transaction between two components. For instance, one flow represents message interaction between C2 and C5, between C2 and C7 and between C7 and C14, among other similar system flows. Each system flow, as mentioned above, can be associated with a weight (see the flow of 802 of FIG. 8) based on traffic parameters, priority of the flow, components involved, and other attributes. Therefore, the system traffic flow between C6 and C9 has a weight of 0.63, whereas the flow between C4 and C8 has a weight of 0.45, and so on.

Once all system traffic flows to be mapped have been identified and assigned weights, one system traffic flow to be mapped first can be identified based on the weight. For instance, for the purposes of the present example implementation, the flow having the least weight can be picked up first for a more optimal route identification. As illustrated in FIG. 9(*b*), the flow between C7 and C14 has the minimum weight of 0.10 and therefore can be picked up for mapping. Once the desired flow has been selected, all possible and eligible routes for the flow can be computed, as illustrated in FIG. 9(*c*), wherein, the first possible route can be C7->C6->C10->C14, the second possible route can be C7->C11->C10->C14, and the third eligible route can be C7->C11->C15->C14. Each eligible route can be associated with a cost function, which can help assess and evaluate the optimality of the route based on traffic parameters and other NoC level attributes, as have been described above. As illustrated in FIG. 9(*c*), the second identified route C7->C11->C10->C14 has the lowest cost function of 9 and therefore, can be chosen as the optimal route for the system traffic flow between hosts C7 and C14. Once the route has been selected, routers and channels can be accordingly allocated and assigned along the route. The final route selection is illustrated in FIG. 9(*d*), which creates a part of the NoC topology. Once all routes are determined, the full NoC topology will be realized.

Figure 10:
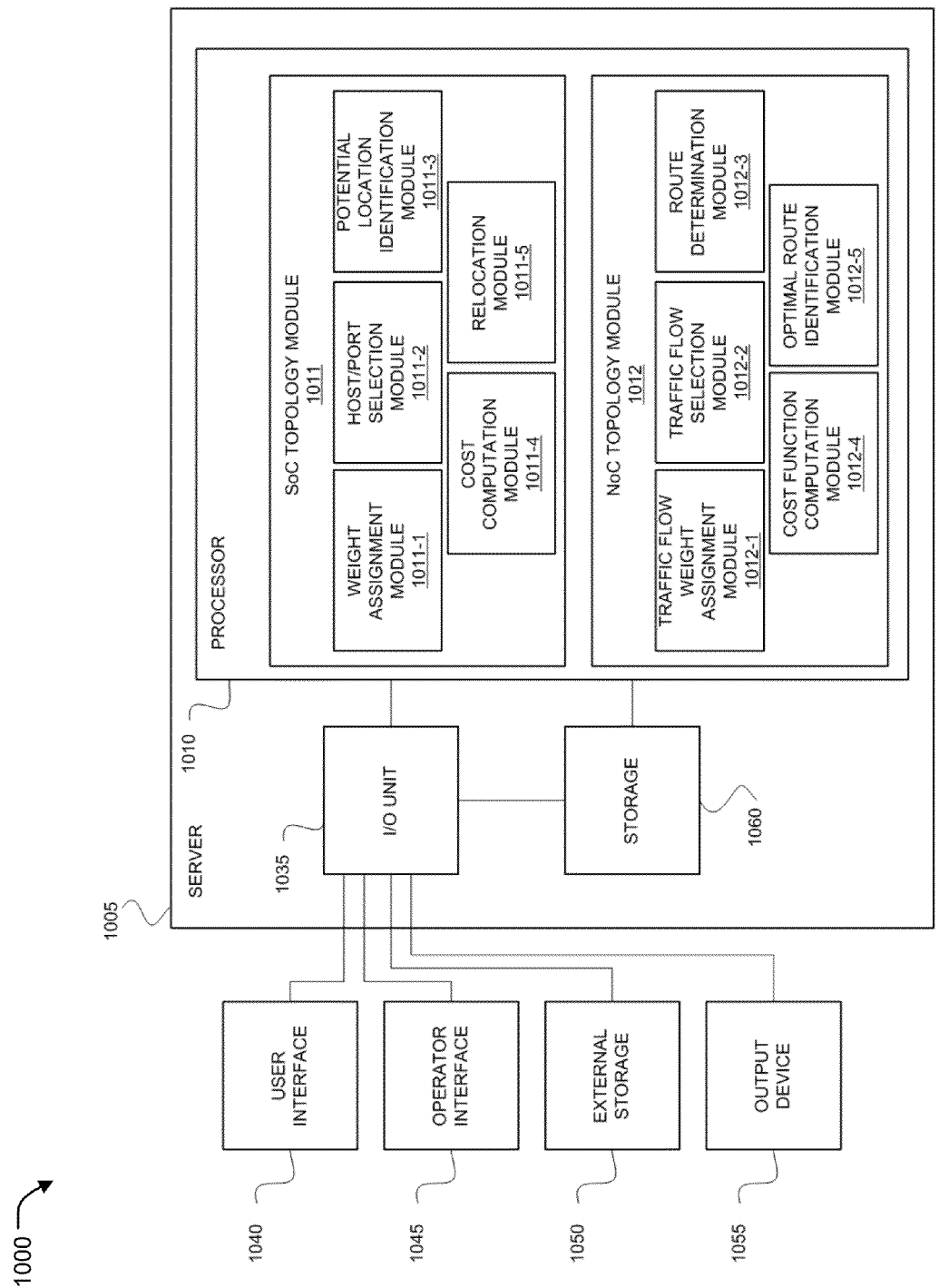
FIG. 10 illustrates an example of computer system on which example implementations can be implemented.

FIG. 10 illustrates an exemplary computer system 1000 on which example implementations may be implemented. The computer system 1000 includes a server 1005 which may involve an I/O unit 1035, storage 1060, and a processor 1010 operable to execute one or more units as known to one of skill in the art. The term "computer-readable medium" as used herein refers to any medium that participates in providing instructions to processor 1010 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include carrier waves. The I/O unit processes input from user interfaces 1040 and operator interfaces 1045 which may utilize input devices such as a keyboard, mouse, touch device, or verbal command.

The server 1005 may also be connected to an external storage 1050, which can contain removable storage such as a portable hard drive, optical media (CD or DVD), disk media or any other medium from which a computer can read executable code. The server may also be connected an output device 1055, such as a display to output data and other information to a user, as well as request additional information from a user. The connections from the server 1005 to the user interface

1040, the operator interface 1045, the external storage 1050, and the output device 1055 may via wireless protocols, such as the 802.11 standards, Bluetooth® or cellular protocols, or via physical transmission media, such as cables or fiber optics. The output device 1055 may therefore further act as an input device for interacting with a user.

The processor 1010 may execute one or more modules including a SoC topology module 1011 and a NoC topology module 1012, wherein the SoC topology module 1011 can be configured to provide high scalability and performance communication between the components in the system and to maximize overall performance metric by positioning, configuring, and orienting components and/or ports thereof in order to minimize latency and enhance overall system bandwidth. Based on traffic-based weights allocated to each port and/or host/component, SoC topology module 1011 identifies ports and/or hosts to be repositioned and accordingly changes their positions based on comparison of cost functions of previous positions and new positions. NoC topology module 1012, on the other hand, identifies systems flows for which optimal routes are to be identified and accordingly maps identified efficient routes to system traffic flows by allocating routers/nodes and channels of the NoC interconnect architecture.

According to one example implementation, SoC topology module 1011 may execute one or more sub-modules and include a weight assignment module 1011-1 configured to assign weights to one or more hosts and/or ports within the hosts within a SoC environment based on various traffic parameters. Host/port selection module 1011-2 of the SoC topology module 1011 can be configured to select a host or a port based on its weight, which may be the lowest or the highest weight depending on the weight assignment module 1011-1. Potential location identification module 1011-3 can be configured to, for the host/port selected by the host/port selection module 1011-2, determine a host based on a probability function f1, wherein the function f1 evaluates the host based on traffic parameters such as latency, bandwidth, frequency of usage, among other like attributes. Once the host has been determined, the port can be perceived to have been relocated to a position that aligns best with the host in context. Although most of the above mentioned embodiments have been explained with respect to the port being selected by module 1011-2, a component/host can also be selected and then relocated/re-positioned/re-oriented. Assuming that a port x1 is identified by module 1011-2, the potential location identification module 1011-3 is configured to identify a host, say h2, based on the function f1 and further identify the best position of the port with respect to the identified host. Cost computation module 1011-4 can be configured to compute a new cost function of the port assuming it has relocated to the new position that is best suited for the detected host h2. Relocation module 1011-5 can be configured to take into consideration initial cost function of the port (initial position), the new cost function (proposed new position), and a probability function f2 to conclude whether the port should be relocated to the new proposed position.

NoC topology module 1012 can further include one or more sub-modules. Traffic flow weight assignment module 1012-1 can be configured to retrieve all system traffic flows and assign weights to one or more system traffic flows. Such weights can be assigned based on traffic parameters such as latency, components involved, bandwidth desired, current bandwidth, among other like parameters. Traffic flow selection module 1012-2 can be configured to order the one or more system traffic flows based on the assigned weights and accordingly select a system traffic flow based on the assigned weight. In an instance, a flow with the lowest weight (having highest latency) can be picked up first. Route determination module 1012-3 can be configured to identify all possible routes for the selected system traffic flow. In an implementation, the identified possible routes can be analyzed to retrieve a list of eligible routes and only the eligible routes can then be processed further. Cost function computation module 1012-4 can be configured to compute the cost function for each identified/eligible route in reference to the concerned system traffic flow. Optimal route identification module 1012-5 can be configured to identify the most eligible route for the selected traffic flow based on the cost function computed by the computation module 1012-4.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method for configuring a Network on Chip (NoC) comprising a plurality of hosts and a plurality of ports, the method comprising:

selecting a port from the plurality of ports based on an assigned weight to the port;

identifying a host from the plurality of hosts for the selected port;

relocating the selected port to the identified host, based on at least one of a cost function and a probability acceptance function; and mapping a system traffic flow selected from a plurality of system traffic flows based on an assigned weight to the system traffic flow, with a route identified from a plurality of routes in the NoC based on another cost function.

2. The method of claim 1, wherein the assigned weight to the port is based on one or more traffic attributes.

3. The method of claim 1, wherein the selecting of the port, the identifying of the host and the relocating of the selected port are repeated iteratively until a threshold is reached, wherein weights assigned to the plurality of ports are updated based on one or more updated probability functions.

4. The method of claim 1, wherein the identifying the host from the plurality of hosts for the selected port is based on another probability acceptance function.

5. The method of claim 1, wherein the cost function and the another cost function are based on at least one of latency, bandwidth, and number of hops.

6. The method of claim 1, wherein the selecting the system traffic flow, the identifying the route, and the mapping the selected system traffic flow are repeated iteratively until all system traffic flows of the NoC are processed.

7. A non-transitory computer readable storage medium storing instructions for configuring a Network on Chip (NoC) comprising a plurality of hosts and a plurality of ports, the instructions comprising:

selecting a port from the plurality of ports based on an assigned weight to the port;

identifying a host from the plurality of hosts for the selected port;

relocating the selected port to the identified host, based on at least one of a cost function and a probability acceptance function; and mapping a system traffic flow selected from a plurality of system traffic flows based on an assigned weight to the system traffic flow, with a route identified from a plurality of routes in the NoC based on another cost function.

8. The non-transitory computer readable storage medium of claim 7, wherein the assigned weight to the port is based on one or more traffic attributes.

9. The non-transitory computer readable storage medium of claim 7, wherein the selecting of the port, the identifying of the host and the relocating of the selected port are repeated iteratively until a threshold is reached, wherein weights assigned to the plurality of ports are updated based on one or more updated probability functions.

10. The non-transitory computer readable storage medium of claim 7, wherein the identifying the host from the plurality of hosts for the selected port is based on another probability acceptance function.

11. The non-transitory computer readable storage medium of claim 7, wherein the cost function and the another cost function are based on at least one of latency, bandwidth, and number of hops.

12. The non-transitory computer readable storage medium of claim 7, wherein the selecting the system traffic flow, the identifying the route, and the mapping the selected system traffic flow are repeated iteratively until all system traffic flows of the NoC are processed.

13. A system for configuring a Network on Chip (NoC) comprising a plurality of hosts and a plurality of ports, the system comprising:

a System on Chip (SoC) topology module configured to select a port from the plurality of ports based on an assigned weight to the port, identify a host from the plurality of hosts for the selected port; relocate the selected port to the identified host, based on at least one of a cost function and a probability acceptance function; and map a system traffic flow selected from a plurality of system traffic flows based on an assigned weight to the system traffic flow, with a route identified from a plurality of routes in the NoC based on another cost function.

14. The system of claim 13, wherein the assigned weight to the port is based on one or more traffic attributes.

15. The system of claim 13, wherein the SoC topology module is configured to iteratively repeat the selecting of the port, the identifying of the host and the relocating of the selected port until a threshold is reached, wherein the SoC topology module is configured to update weights assigned to the plurality of ports based on one or more updated probability functions.

16. The system of claim 13, wherein the SoC topology module is configured to identify the host from the plurality of hosts for the selected port based on another probability acceptance function.

17. The system of claim 13, wherein the cost function and the another cost function are based on at least one of latency, bandwidth, and number of hops.

* * * * *